United States Patent
Stay et al.

(10) Patent No.: US 11,327,472 B2
(45) Date of Patent: May 10, 2022

(54) SYSTEM AND METHOD OF CONNECTION MANAGEMENT DURING SYNCHRONIZATION OF HIGH AVAILABILITY INDUSTRIAL CONTROL SYSTEMS

(71) Applicant: Rockwell Automation Technologies, Inc., Mayfield Heights, OH (US)

(72) Inventors: Nicholas Stay, Milwaukee, WI (US); Kyle Neet, Mayfield Heights, OH (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 0 days.

(21) Appl. No.: 17/226,339

(22) Filed: Apr. 9, 2021

(65) Prior Publication Data
US 2021/0223762 A1    Jul. 22, 2021

Related U.S. Application Data

(63) Continuation-in-part of application No. 16/277,285, filed on Feb. 15, 2019.

(60) Provisional application No. 62/703,986, filed on Jul. 27, 2018.

(51) Int. Cl.
| | | |
|---|---|---|
| *G06F 11/00* | (2006.01) | |
| *G05B 19/418* | (2006.01) | |
| *H04L 45/122* | (2022.01) | |

(52) U.S. Cl.
CPC . *G05B 19/41855* (2013.01); *G05B 19/41835* (2013.01); *G05B 19/41845* (2013.01); *H04L 45/122* (2013.01)

(58) Field of Classification Search
CPC ........ G05B 19/41855; G05B 19/41845; G05B 19/41835; G05B 2219/33251; H04L 45/122; Y02P 90/02
USPC ...................................................... 714/1–57
See application file for complete search history.

(56) References Cited

U.S. PATENT DOCUMENTS

| | | | |
|---|---|---|---|
| 6,549,034 B1 | 4/2003 | Pietrzyk et al. | |
| 2001/0024448 A1* | 9/2001 | Takase | G06F 9/4494 370/428 |
| 2003/0224729 A1 | 12/2003 | Arnold | |
| 2004/0039938 A1 | 2/2004 | Katz et al. | |
| 2005/0060606 A1* | 3/2005 | Kalan | G05B 9/03 714/12 |
| 2005/0102490 A1* | 5/2005 | Itoh | G06F 9/4494 712/25 |
| 2005/0249121 A1 | 11/2005 | Matsunaga | |

(Continued)

OTHER PUBLICATIONS

European Examination Communication dated May 27, 2021; Application No. 19 188 033.5-1202—(6) pages.

(Continued)

*Primary Examiner* — Sarai E Butler
(74) *Attorney, Agent, or Firm* — Boyle Fredrickson, SC

(57) ABSTRACT

An industrial controller executes a control program held in non-transitory medium to: (a) open connections for the communication of data on the industrial control network, the connection subject to a timeout; (b) operate in a synchronized state with the second industrial controller to execute a same control program to communicate same control data; (c) operate in an unsynchronized state providing no-operation data to the industrial control network, the no-operation data preventing timeout of the open connections on which it is communicated.

19 Claims, 27 Drawing Sheets

(56) References Cited

U.S. PATENT DOCUMENTS

| | | |
|---|---|---|
| 2008/0232358 A1 | 9/2008 | Baker et al. |
| 2008/0294784 A1 | 11/2008 | Wang |
| 2009/0063891 A1* | 3/2009 | Arimilli ................ H04L 45/302 714/2 |
| 2010/0023595 A1 | 1/2010 | McMillian et al. |
| 2010/0329248 A1 | 12/2010 | Eggert et al. |
| 2011/0038358 A1 | 2/2011 | Wang et al. |
| 2011/0107157 A1 | 5/2011 | Okamoto et al. |
| 2012/0030769 A1 | 2/2012 | De Laet |
| 2012/0089812 A1* | 4/2012 | Smith ................... G06F 15/825 712/21 |
| 2012/0110372 A1 | 5/2012 | Borgendale et al. |
| 2012/0330452 A1* | 12/2012 | Guenther ......... G05B 19/41875 700/110 |
| 2013/0044118 A1* | 2/2013 | Rajendran ............ G06F 9/3861 345/506 |
| 2014/0022997 A1* | 1/2014 | Xue ...................... H04W 24/10 370/328 |
| 2014/0359374 A1* | 12/2014 | Shirlen ............... G06F 11/3636 714/45 |
| 2015/0186216 A1* | 7/2015 | Lee ......................... H04L 45/28 714/4.2 |
| 2015/0207880 A1 | 7/2015 | Jin et al. |
| 2015/0323910 A1* | 11/2015 | McLaughlin ........... H04L 67/10 700/20 |
| 2015/0363252 A1* | 12/2015 | Singh .................. G06F 11/0772 714/57 |
| 2016/0044199 A1* | 2/2016 | Nago .................. H04N 1/00477 358/1.15 |
| 2016/0149804 A1 | 5/2016 | Mirza |
| 2016/0226776 A1 | 8/2016 | Lee |
| 2016/0323175 A1 | 11/2016 | Liu et al. |
| 2016/0352800 A1 | 12/2016 | Mulcahy et al. |
| 2017/0085472 A1* | 3/2017 | Roberts ............... H04L 49/9057 |
| 2017/0097624 A1* | 4/2017 | Viste ................... G06F 9/44526 |
| 2017/0223045 A1 | 8/2017 | Claes |
| 2018/0048591 A1 | 2/2018 | Sellappa et al. |
| 2018/0278522 A1 | 9/2018 | Asati et al. |
| 2019/0012286 A1 | 1/2019 | Benedict et al. |
| 2020/0033840 A1 | 1/2020 | Balasubramanian et al. |

OTHER PUBLICATIONS

Industrial Communication Networks; "High availability automation networks—Part 3: Parallel Redundancy Protocol (PRP) and Hight-availability Seamless Redundancy (HSR)", EIC 62439-3:2016 RLV, IEC, Mar. 31, 2016, pp. 1-540, XP082002757—(544) pages.

Clemens Hoga: "Seamless communication redundancy of IEC 62439", Advanced Power System Automation and Protection (APAP), 2011 International Conference on, IEEE, Oct. 16, 2011, pp. 489-494, XP032162391, DOI: 10.1109/APAP.2011.6180451, ISBN: 978-1-4244*-9622-8—(6) pages.

Araujo J A et al.: "Duplicate and circulating frames discard methods for PRP and HSR (IEC62439-3)", IECON 2013—39th Annual Conference of the IEEE Industrial Electronics Society, IEEE, Nov. 10, 2013, pp. 4451-4456, XP032539536, ISSN: 1553-572X, DOI: 10.1109/ECON. 2013.6699852—(6) pages.

Park Hyungbae et al: "Toward Control Path High Availability for Software-Defined Networks"; 2015 11th International Conference on the Design of Reliable Communication Networks (DRCN), IEEE, Mar. 24, 2015, pp. 165-172, XP033170503, DOI: 10.1109/DRCN.2015.7149008 (retrieved on Jul. 2, 2015)—(8) pages.

Advait Dixit et al: "Towards an Elastic Distributed SDN Controller", Hot Topics in Software Defined Networking, ACM, 2 Penn Plaza, Suite 701 New York, NY 10121-0701 USA, Aug. 16, 2013, pp. 7-12, XP058030691, DOI: 10.1145/2491185.2491193; ISBN: 978-1-4503-2178-5—(6) pages.

Extended European Search Report dated Dec. 18, 2019; Application No./Patent No. 19188033.5-1204—(12) pages.

* cited by examiner

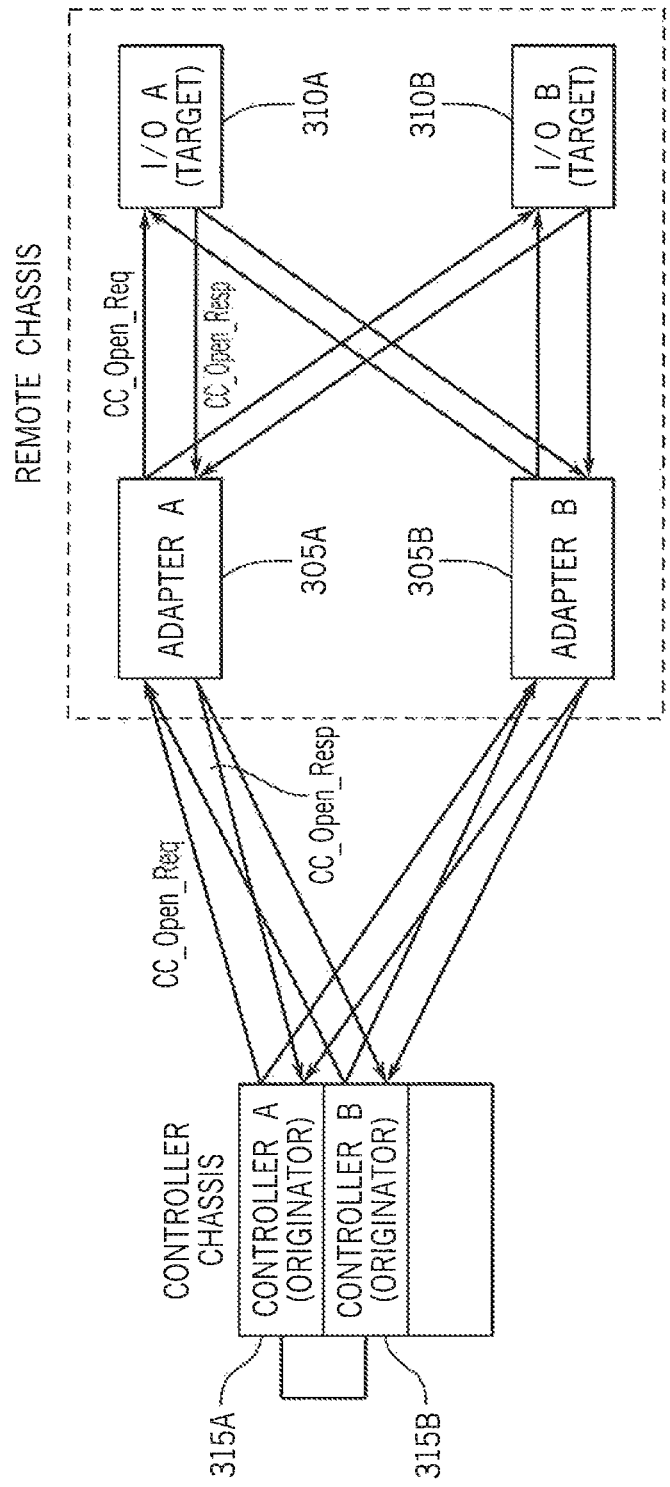

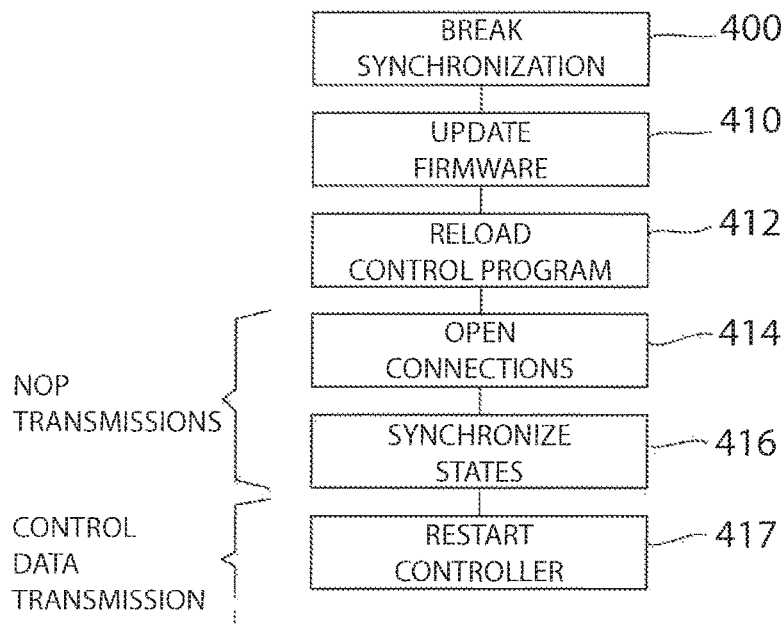
Fig. 48
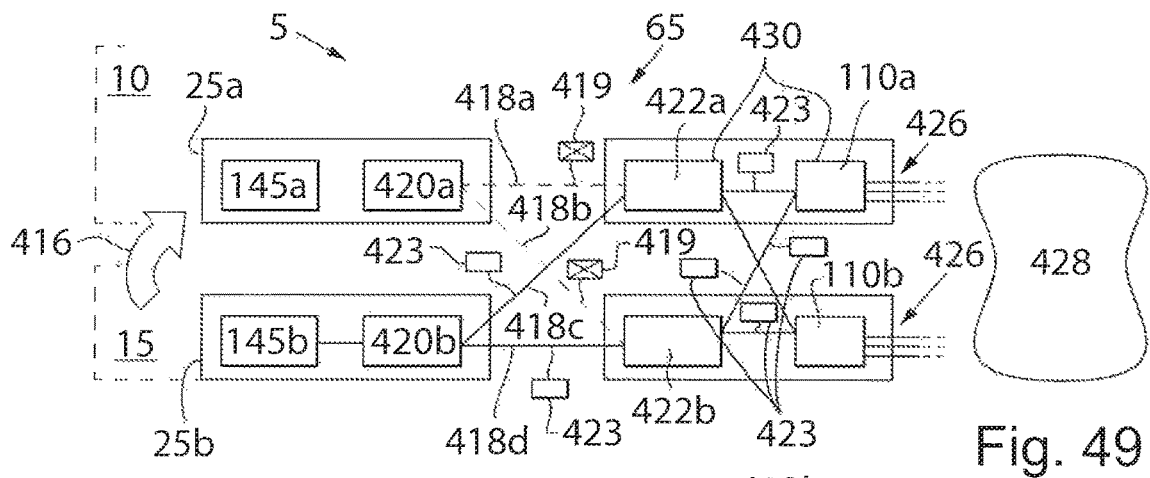
Fig. 49
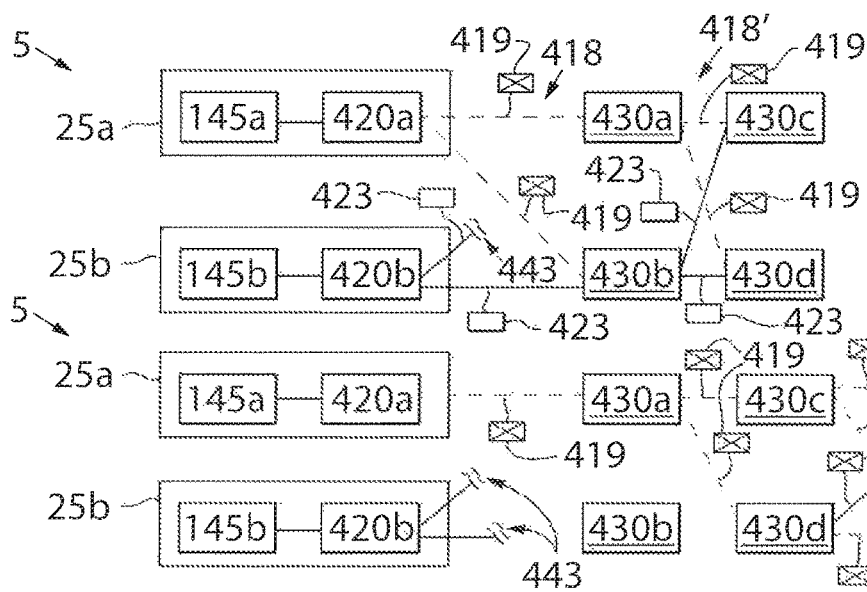
Fig. 50
Fig. 51

SYSTEM AND METHOD OF CONNECTION MANAGEMENT DURING SYNCHRONIZATION OF HIGH AVAILABILITY INDUSTRIAL CONTROL SYSTEMS

RELATED APPLICATION

This application is a continuation in part of U.S. application Ser. No. 16/277,285 filed Feb. 15, 2019 which claims the benefit of U.S. Patent Application No. 62/703,986, filed on Jul. 27, 2018, both entitled "System and Method of Communicating Data Over High Availability Control Systems," and hereby incorporated herein by reference.

BACKGROUND INFORMATION

The subject matter disclosed herein relates to a high availability (HA) industrial control system. More specifically, the subject matter disclosed herein relates to systems and methods of communicating data over an industrial control network in a high availability industrial control system.

As is known to those skilled in the art, industrial controllers are specialized electronic computer systems used for the control of industrial processes or machinery. An example industrial controller is a programmable logic controller (PLC) used in a factory environment. Industrial controllers differ from conventional computers in a number of ways. Physically, they are constructed to be substantially more robust against shock and damage and to better resist external contaminants and extreme environmental conditions. The processors and operating systems of industrial controllers are optimized for real-time control and execute languages allowing ready customization of programs to comport with a variety of different controller applications. Industrial controllers may have an operator interface for accessing, controlling, and/or monitoring the industrial controller. An example operator interface can include a locally connected terminal having a keyboard, mouse, and display.

A HA control system attempts to maintain operation of the control system even in the event of a failure within the system. In order to maintain operation, a HA control system typically includes redundant subsystems such as redundant industrial controllers, redundant backplanes, redundant bridges, redundant adapters, redundant input/output (IO) modules, redundant motor drives, and/or redundant communication networks. Physical redundancy is provided in each subsystem such that if a single failure occurs in one of the elements in the subsystem, operation of the subsystem can continue via the redundant element(s). For example, if one of the redundant controllers fails, operation can continue using the other controller(s). Similarly, if a failure occurs on one network, backplane, bridge, adapter or I/O module, the operation can continue via one or more redundant networks, backplanes, bridges, adapters, or I/O modules.

During operation, a HA control system may utilize one component as an active component and the other component as a back-up component. The back-up component receives the same input signals, generates the same output signals, and/or performs the same operations as the active component such that the status of the backup-up component is identical to the status of the active component. However, actual control of the controlled system is performed by the active component. Upon failure of the active component, switches, for example, may disconnect the active component and connect the back-up component to maintain operation of the controlled system. A brief switchover time occurs as one component is disconnected, and the other component is connected. Some applications, however, are so highly dependent on continuous operation that any delay, or switchover time, in the HA control system in the event of a failure in some subsystem is a detriment to the application. For example, a power plant performing a generating operation requires utmost continuous operation during the generating operation. Any delay in an HA control system due to a failure in some subsystem can be a significant detriment to the power plant.

BRIEF DESCRIPTION

The present inventors have recognized that the time required to open often thousands of connections in an industrial control network can be an impediment to rapid synchronization of an active and backup component, particularly, when one component is subject to updating, for example, in a firmware update.

The subject matter disclosed herein relates in some embodiments to an industrial controller of the type providing control data on an industrial control network to one or more I/O circuits generating signals to control an industrial process. The industrial controller may operate in conjunction with a second industrial controller also communicating with the one or more I/O circuits to provide high-availability control of the industrial process. More specifically, the industrial controller may operate to open connections for the communication of data on the industrial control network and to operate in a synchronized state with the second industrial controller to execute a same control program to communicate same control data to the industrial control network using the open connections and operate in an unsynchronized state providing no-operation data to the industrial control network using the open connections, the no-operation data being different from the control data communicated by the second industrial controller yet preventing timeout of the open connections on which it is communicated. By this means, connection timeouts may be avoided when one controller is being updated or the like allowing more rapid recovery from a synchronization loss.

The invention may be part of an industrial control system further including network communication nodes, and the industrial controller may further operate to attach a hop counter value to the no-operation data. The network communication nodes (i) when presented with control data and no-operation data on the open connections, forward the control data and decrement the hop counter of the no-operation data and forward the no-operation on to other connections only when the hop counter has not decremented to zero; and (ii) when presented with first control data and second control data, select between the first control data and second control data to forward one of the first control data and second control data to the other connections. In this way, network bandwidth may be better conserved.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which:

FIG. 12 is a block diagram representation of a data message format for a concurrent connection open request according to one embodiment of the invention;

FIG. 13 is flow diagram illustrating message flow between modules for a concurrent connection open process in another exemplary high availability control system;

FIG. 48 is a flowchart of program steps executed by an industrial controller during an updating of its firmware and/or programs;

FIG. 49 is a block diagram of one embodiment of the invention implementing no-operation transmissions during a synchronization event;

FIG. 50 is a figure similar to FIG. 49 showing a forwarding of no-operation data to preserve connections when there is partial interruption of control data from a second industrial controller;

FIG. 51 is a figure similar to that of FIGS. 49 and 50 showing a forwarding of no-operation data when there is complete interruption of data flow from a second industrial controller such as preserves connections but can obscure network failure from legacy I/O modules;

Figure 1:
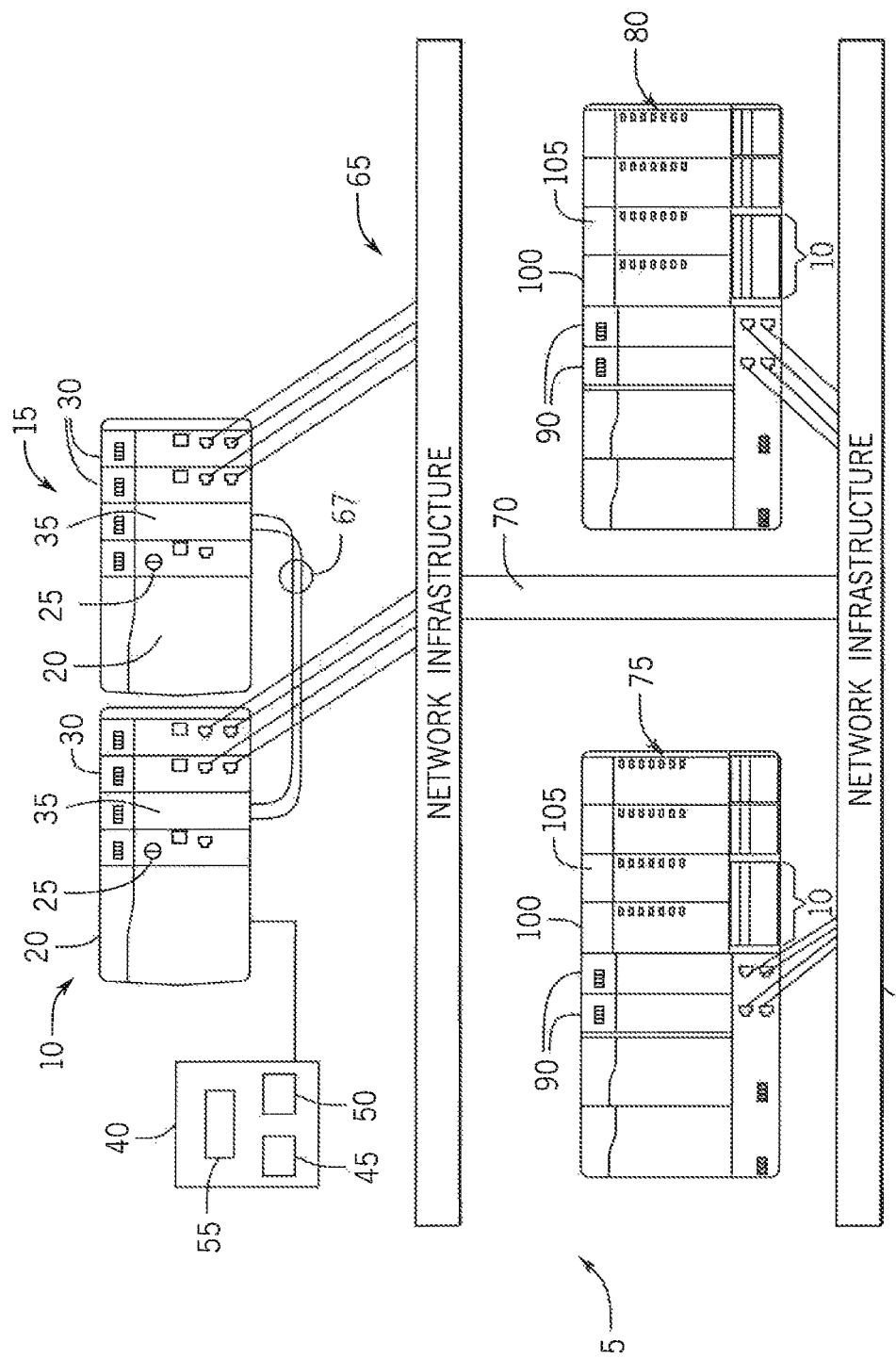
FIG. 1 is a block diagram of one embodiment of a high availability industrial control system.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

Figure 2:
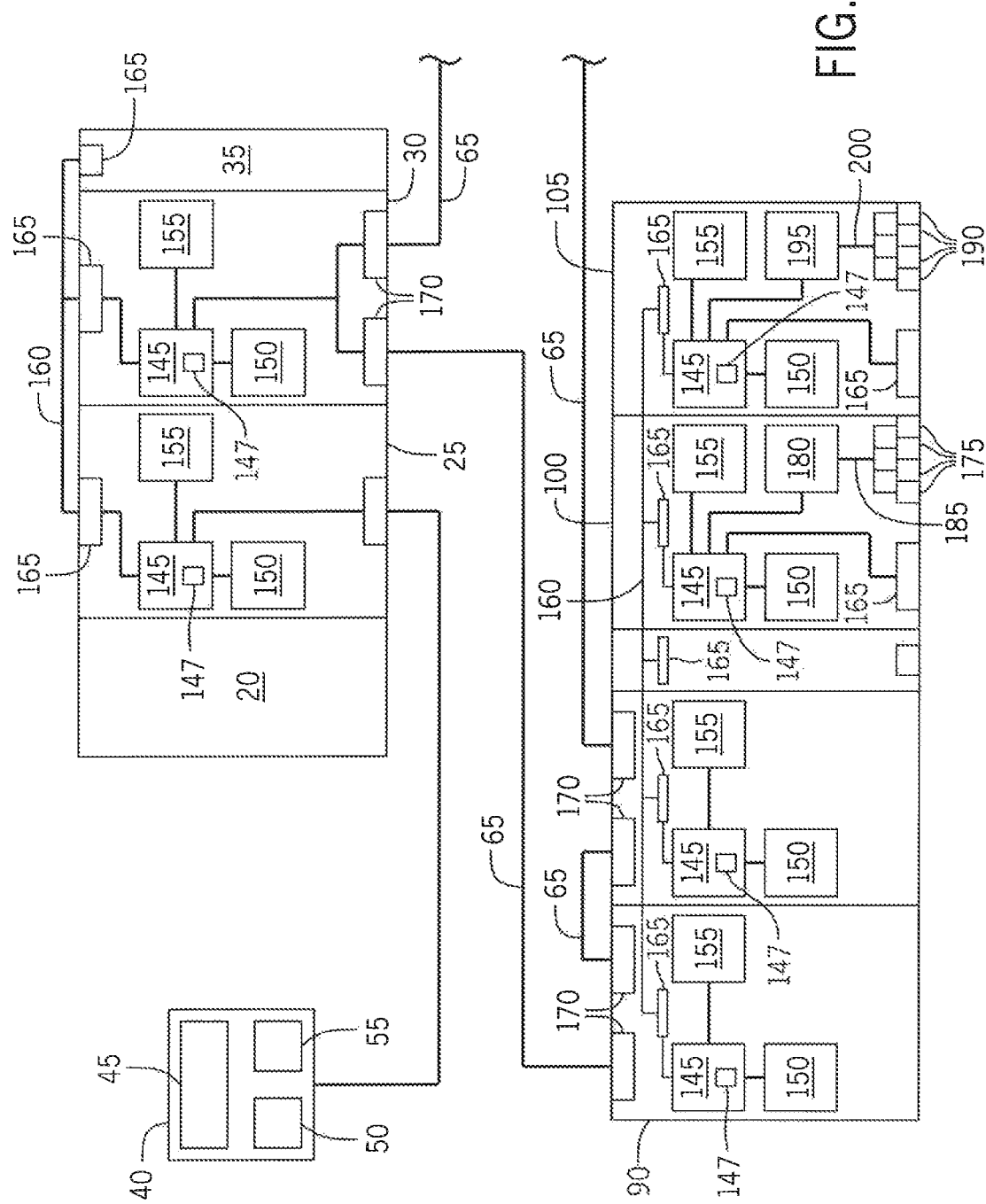
FIG. 2 is a block diagram further representing aspects of the industrial control system of FIG. 1.

Turning first to FIG. 1 and FIG. 2, an exemplary industrial control system 5 with redundant subsystems is illustrated. The industrial control system 5 includes a first controller chassis 10 and a second controller chassis 15. As illustrated, the first and second controller chassis 10 and 15 are modular and may be made up of numerous different modules. Additional modules may be added, or existing modules removed and the first and second controller chassis 10 and 15 reconfigured to accommodate the new configuration. Optionally, either the first controller chassis 10 and/or the second controller chassis 15 may have a predetermined and fixed configuration. The first and second controller chassis 10 and 15 may have a single backplane or dual backplanes to facilitate communication between modules in the chassis. In the exemplary system shown, both the first and second controller chassis 10 and 15 include a power supply module 20, a controller (or also referred to as simply "controller") 25, and network bridge modules 30. Each controller chassis 10 and 15 is further shown with an additional module 35 that may be selected according to the application requirements. For example, the additional module 35 may be an analog or digital input or output module, which will be referred to herein generally as an I/O module. Optionally, each chassis may be configured to have multiple additional modules 35 according to the application requirements. For ease of illustration, a single additional module 35 is illustrated and the illustrated module is a redundancy module to facilitate dual chassis controller redundancy.

An operator interface 40 is shown connected to the industrial control system. The operator interface 40 can include a processing device 45 and an input device 50. The input device 50 can include, but not limited to, a keyboard, touchpad, mouse, track ball, or touch screen. The operator interface can further include an output device 55. The output device 55 can include, but is not limited to, a display, a speaker, or a printer. It is contemplated that each component of the operator interface 40 may be incorporated into a single unit, such as an industrial computer, laptop, or tablet computer. It is further contemplated that multiple operator interfaces can be distributed about the industrial control system 5. The operator interface 40 may be used to display operating parameters and/or conditions of the controlled machine or process, receive commands from the operator, or change and/or load a control program or configuration parameters. An interface cable connects the operator interface 40 to the controller 25 on the first controller chassis 10.

The first and second controller chassis 10 and 15 are connected to other devices by a network 65 according to the application requirements. A redundant network topology is established by connecting the network bridge modules 30 of the controller chassis 10 and 15 to a redundant network infrastructure 70 by a suitable network of cables. The network infrastructure 70 connects to a first remote chassis 75 and a second remote chassis 80. It is contemplated that the network cables may be custom cables configured to communicate via a proprietary interface or may be any standard industrial network, including, but not limited to, Ethernet/IP, DeviceNet, or ControlNet. The network bridge modules 30 and the network 70 are configured to communicate according to the protocol of the network to which it is connected and may be further configured to translate messages between two different network protocols. Dedicated interface cables 67 connect the redundancy modules 35 in each chassis to each other, providing a dedicated communication channel between the controller 25.

The first and second remote chassis 75 and 80 are positioned at varying positions about the controlled machine or process. As illustrated, the first and second remote chassis 75 and 80 are modular and may be made up of numerous different modules connected together in a chassis or mounted on a rail. Additional modules may be added, or existing modules removed and the remote chassis 75 or 80 reconfigured to accommodate the new configuration. Optionally, the first and second remote chassis 75 and 80 may have a predetermined and fixed configuration. The first and second remote chassis 75 and 80 may have a single backplane or dual backplanes to facilitate communication between modules in the chassis. As illustrated, the first and second remote chassis 75 and 80 each includes a pair of network adapter modules 90, an input module 100, and an output module 105. Each network adapter module 90 is connected to the redundant network infrastructure 70 by a suitable network of cables. Each of the input modules 100 is configured to receive input signals from controlled devices, and each of the output modules 105 is configured to provide output signals to the controlled devices. Optionally, still other modules may be included in a remote chassis. Dual or triple redundant input modules 100 and/or output modules 105 may be included in a remote and/or controller chassis. It is understood that the industrial control network, industrial controller, and remote chassis may take numerous other forms and configurations without deviating from the scope of the invention. It should also be understood that an input module 100 and an output module 105 can form an I/O module 110.

Referring next to FIG. 2, a portion of the exemplary industrial control system of FIG. 1 is illustrated in block diagram form. It is contemplated that each of the modules in the system may include a processor 145 and a memory 150. The processors 145 are configured to execute instructions and to access or store operating data and/or configuration parameters stored in the corresponding memory 150. The processors 145 are suitable processors according to the node requirements. It is contemplated that the processors 145 may include a single processing device or multiple processing devices executing in parallel and may be implemented in separate electronic devices or incorporated on a single electronic device, such as a field programmable gate array (FPGA) or application specific integrated circuit (ASIC). The processors 145 include random access memory 147 for processing runtime data. The memory 150 may be comprised of non-transitory storage mediums that may be a single device, multiple devices, or may be incorporated in part or in whole within the FPGA or ASIC. Each of the modules also includes a clock circuit 155, and each clock circuit 155 is preferably synchronized with the other clock circuits 155 according to, for example, the IEEE-1588 clock synchronization standard. Each clock circuit 155 generates a time signal configurable to report the present time accurate to either microseconds or nanoseconds. Communication between modules mounted in the same chassis or contained within a single housing occurs via a backplane 160. The backplane 160 may be a single backplane or dual backplanes and include a corresponding backplane connector 165. Modules communicating via network media include ports 170 configured to process the corresponding network protocol. The input module 100 includes input terminals 175 configured to receive the input signals from the controlled devices. The input module 100 also includes any associated logic circuitry 180 and internal connections 185 required to process and transfer the input signals from the input terminals 175 to the processor 145. Similarly, each output module 105 includes output terminals 190 configured to transmit the output signals to the controlled devices. The output module 105 also includes any associated logic circuitry 195 and internal connections 200 required to process and transfer the output signals from the processor 145 to the output terminals 190.

In operation, a connection is the transport layer mechanism in an industrial protocol to transfer bi-directional data between two end points typically at a given periodic interval. Some connection types do not transfer data at periodic interval, but instead, transfer data either on occurrence of an event or in response to a programmatic request/response mechanism. Some connections transfer data in only one direction while in the reverse direction only a heartbeat indication is sent to keep the connection alive. But, in general, connections transfer data in both directions.

A connection is opened by a connection open service request from a connection originator module to a connection target module through zero or more intermediate modules via messages sent over backplane(s) and/or network(s). The connection originator module is usually a controller in a controller chassis or a human machine interface (HMI). The connection target module may be, for example, an I/O module, a motor drive module, another controller, network adapter module, or a network bridge module in the same chassis as controller or in a remote chassis. The intermediate modules may be one or more of a network bridge module and/or network adapter module. The connection open request message contains parameters defining the connection such as a connection type, data size to transfer in each direction, a duration of a periodic interval at which the message is transmitted, a connection timeout duration, an end-to-end path from the originator module to the target module through intermediate modules, and the like. These parameters are used to allocate resources (e.g., CPU bandwidth, memory, and network bandwidth) to service the connection at runtime on a module associated with the connection. When resources are successfully allocated on the modules associated with a connection, a success response is conveyed back from the target module to the originator module in a reverse direction from the connection open request, and the connection is operational for runtime data transfer. If the resources cannot be allocated on one of the modules associated with a connection or if one of the modules cannot communicate the connection open request message to the next module in the path, then a failure response is returned to the originator module from the module at which the connection open request failed.

Once a connection is opened, it can be closed either through a connection close service request from the originator module to the target module of the connection through any intermediate modules that are part of the connection. Optionally, the connection may also be closed through a runtime connection timeout mechanism. During runtime, every module that is part of a connection monitors data reception from its upstream module(s) in one or both directions as appropriate for an end module or an intermediate module, respectively, and when data is not received in the monitored direction for a length of time equal to the connection timeout duration, the module at which the connection timeout occurred will close the connection to recover allocated resources. A connection timeout may happen as a result of a module failure or of a communication failure in a network or a backplane.

Figure 3:
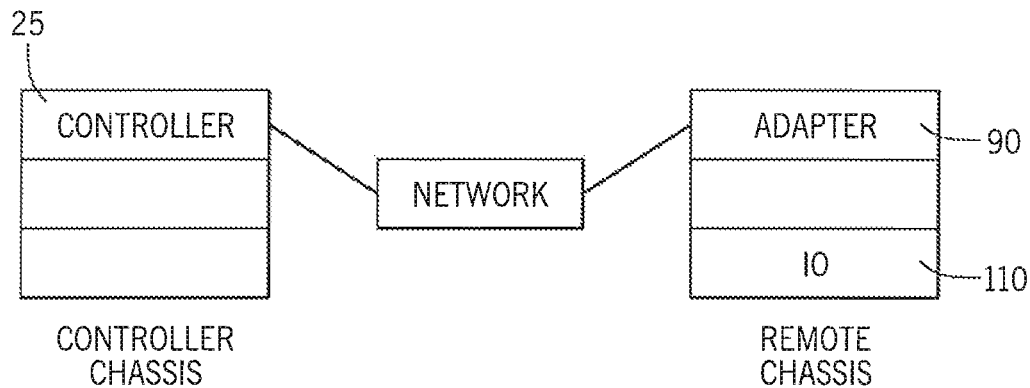
FIG. 3 is a block diagram representing one embodiment of an exemplary industrial control system in which the present invention may be incorporated.

Turning next to FIG. 3, a first embodiment of a control system includes a controller 25 in a controller chassis, and a network adapter module 90 and an I/O module 110 in a remote chassis, where the controller chassis and the remote chassis are connected via a network infrastructure 70. The controller 25 is capable of directly communicating on the network and is connected to network infrastructure 70 through a network cable. Similarly, the network adapter module 90 on the remote chassis is connected to the network infrastructure 70 through a network cable and communicates with an I/O module 110 on the same chassis over a backplane within the chassis. A connection is opened from the controller 25, acting as a connection originator module, to the I/O module 110, acting as a connection target module, by sending a connection open request message over the network infrastructure 70 to the network adapter module 90 on the remote chassis, where the network adapter module is acting as an intermediate module. The network adapter module 90 in turn sends the connection open message to the I/O module 110 over the backplane in the chassis. A success response is returned from the I/O module 110 to the controller 25 in the reverse direction via the network adapter module 90 and the network infrastructure 70 and the connection is now open to transfer data.

Once the connection has been established, the modules are no longer referred to as an originator module and a target module, as used during the open/close process. Rather, the terms producer and consumer are used to identify a runtime data producer and data consumer in a connection. Since the data transfer is bidirectional in general, there controller 25 is both a producer, P(c), and a consumer C(c), depending on the source and direction of the data flow. Similarly, the I/O module 110 is both a producer, P(io), and a consumer, C(io), depending on the source and direction of the data flow.

Figure 4:
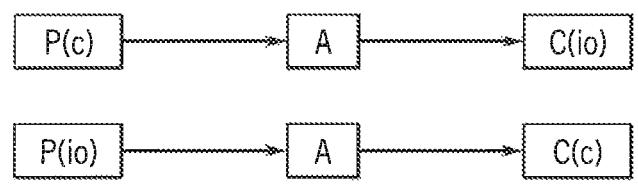
FIG. 4 is a runtime data flow diagram representation of a prior art connection established in the control system of FIG. 3.

With reference to FIG. 4, a representation of the bidirectional data flow in a prior art connection is illustrated. A runtime data flow model corresponding to the modules in FIG. 3 is shown with block A representing the network adapter module 90. Previously, a connection established a single end-to-end path for bidirectional data flow. As illustrated, data flows in one direction from P(io) to C(c) when the I/O module 110 is generating data and sending the data to the controller 25 via the connection, and data flows in the other direction from P(c) to C(io) when the controller 25 is generating data and sending the data to the I/O module 110. The prior art connection, however, has only one end-to-end path identified between the originator module and the target module with bi-directional runtime data flow capability when the connection is established.

Figure 5:
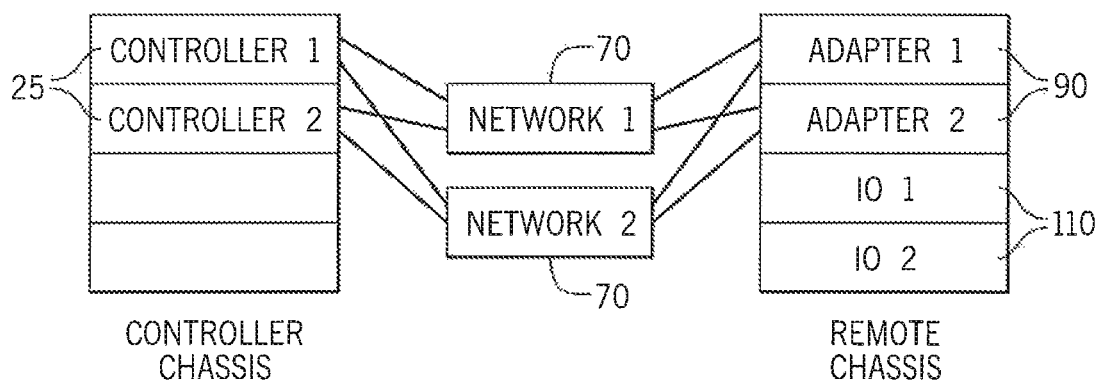
FIG. 5 is a block diagram representing another embodiment of a high availability control system incorporating the present invention.

The present invention provides for multiple end-to-end paths in a single connection, improving the reliability of a HA control system. A HA control system typically includes several redundant subsystems such as redundant industrial controllers, redundant backplanes, redundant bridges, redundant adapters, redundant input/output (IO) modules, redundant motor drives, and/or redundant communication networks. Physical redundancy is provided in each subsystem such that if a failure occurs in one of the elements in a subsystem the operation can continue via the other element(s). With reference next to FIG. 5, one embodiment of a HA control system with redundant subsystems is illustrated. The illustrated embodiment includes two controllers 25, Controller 1 and Controller 2, in the controller chassis. The controllers 25 communicate with each other through a dual backplane in the controller chassis. Each of the controllers 25 is connected to two network infrastructures 70, Network 1 and Network 2, through network cables. The remote chassis contains two I/O modules 110, IO 1 and IO 2, and two network adapter modules 90, Adapter 1 and Adapter 2. The I/O modules 110 and network adapter modules 90 on the remote chassis communicate with each other through dual backplanes within the remote chassis. The network adapter modules 90 are each connected to the two network infrastructures 70 through network cables. The I/O modules 110 have a limited number of IO terminal points, for example, eight IO terminals, which can be connected to controlled devices. Each corresponding IO terminal on both redundant I/O modules 110 on the remote chassis is wired to same controlled device for redundancy. Although illustrated with a single pair of redundant I/O modules 110 and eight IO terminals, a typical HA control system has thousands of such redundant IO terminal points wired to controlled devices throughout the controlled machine or process.

In a HA control system, a concurrent connection is used for bi-directional data transfer between redundant end modules, for example, between the redundant controllers 25 and redundant I/O modules 110 shown in FIG. 5. A concurrent connection is the fault tolerant transport layer mechanism to transfer bi-directional data between multiple redundant end points in a HA control system at periodic intervals, responsive to events triggering a transfer, or responsive to a request/response transfer. A concurrent connection sets up and manages bi-directional data transfer between redundant end modules over multiple redundant end-to-end paths using the physical redundancies in each subsystem such that one or more failures in different subsystems will not affect data transfer so long as at least one end module is available at each end and at least one end-to-end path is available for data transfer between the modules at each end of the connection. Concurrent connections have architectural flexibility to deal with varying levels of physical redundancy in each subsystem. For example, a concurrent connection can handle subsystems with no, or with varying levels of redundancy, such as a single controller, dual redundant adapters, and triple redundant I/O modules. A typical HA control system has thousands of concurrent connections between redundant controllers and redundant I/O modules, between redundant controllers and other redundant controllers, between redundant controllers and a human machine interface (HMI), or a combination thereof.

Figure 6:
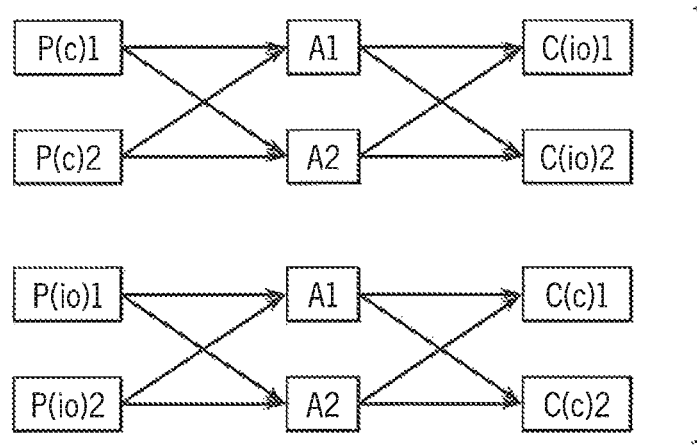
FIG. 6 is a runtime data flow diagram representation of one embodiment of a concurrent connection established in the high availability control system of FIG. 5.

A single concurrent connection has multiple end-to-end data paths between redundant end modules. With reference next to FIG. 6, a runtime data flow model is illustrated for a single concurrent connection in the exemplary HA control system from FIG. 5. In a first direction of data flow, the I/O modules 110 may both be producers, P(io)1 and P(io)2, and the controllers 25 may both be consumers, C(c)1 and C(c)2. In the other direction of data flow, the controllers 25 may both be producers, P(c)1 and P(c)2, and the I/O modules 110 may both be consumers, C(io)1 and C(io)2. The two network adapter modules 90 are represented by A1 and A2. According to the illustrated flow model, there are three module stages (i.e. a controller stage, an adapter stage, and an I/O module stage) with dual redundancy in each stage.

As will be discussed in more detail below, identical data is transmitted from each producer to each consumer in tandem via redundant data packets along the different end-to-end paths in a single concurrent connection. There are eight end-to-end paths that can be used for bi-directional data transfer of the same data. Examples of end-to-end paths are P(c)1:A1:C(io)1; P(c)2:A1:C(io)1; and etc. with their corresponding reverse paths. So long as at least one controller 25 and one I/O module 110 and one of the end-to-end data paths between them are working, data is communicated between the modules and control can be maintained.

Figure 7:
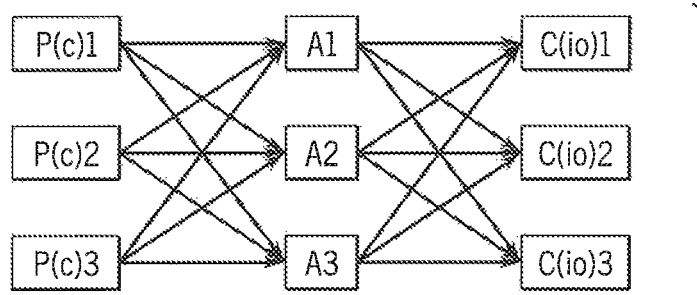
FIG. 7 is a runtime data flow diagram representation of another embodiment of a concurrent connection established in a high availability control system with triple redundancy.

With reference next to FIG. 7, another runtime data flow model is illustrated for a concurrent connection established in a HA control system with three stages and triple redundancy in each stage. In other words, the controller chassis includes three redundant controllers 25, the remote chassis includes three redundant I/O modules 110 and three redundant network adapter modules 90. Similarly, a triple redundant network infrastructure 70 is established between the controller chassis and the remote chassis. In the illustrated embodiment, there are twenty-seven end-to-end paths that can be used for data transfer in the single concurrent connection.

Figure 8:
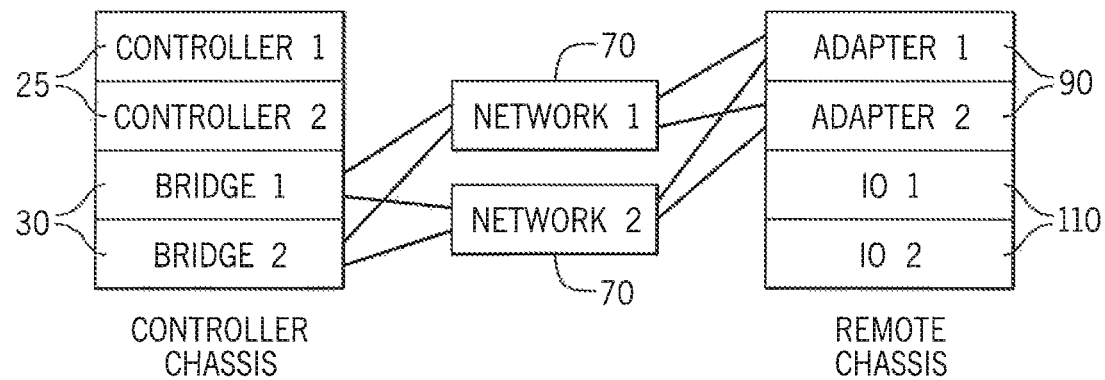
FIG. 8 is a block diagram representing another embodiment of a high availability control system incorporating the present invention.
Figure 9:
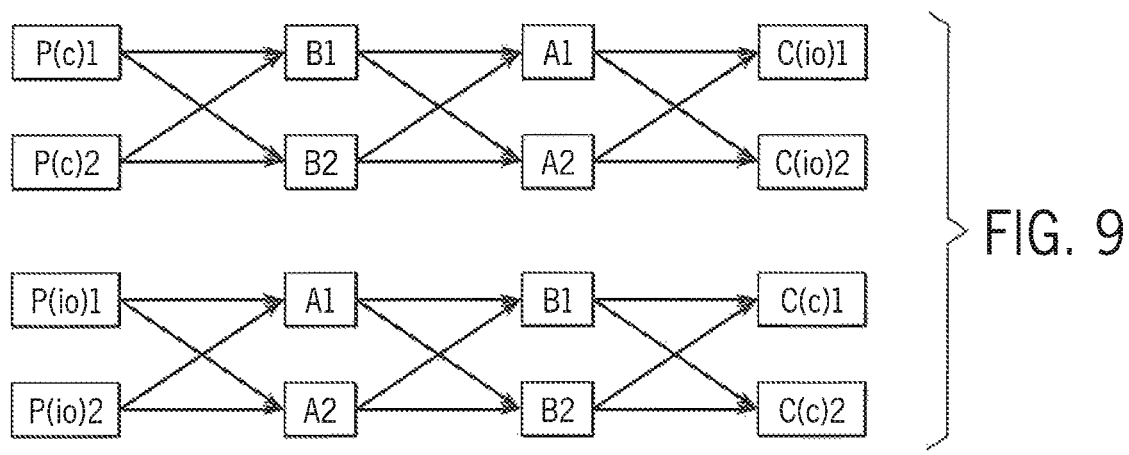
FIG. 9 is a runtime data flow diagram representation of one embodiment of a concurrent connection established in the high availability control system of FIG. 8.

With reference also to FIG. 8, another embodiment of a HA control system with network bridge modules 30 included is illustrated, and FIG. 9 shows the runtime data flow model for a concurrent connection established in the HA control system of FIG. 8. The bridge modules 30 are represented by B1 and B2 in the data flow model. There are four stages (i.e. a controller stage, a bridge stage, an adapter stage, and an I/O module stage) and dual redundancy in each stage. In this case there are sixteen end-to-end paths that can be used for data transfer.

Figure 10:
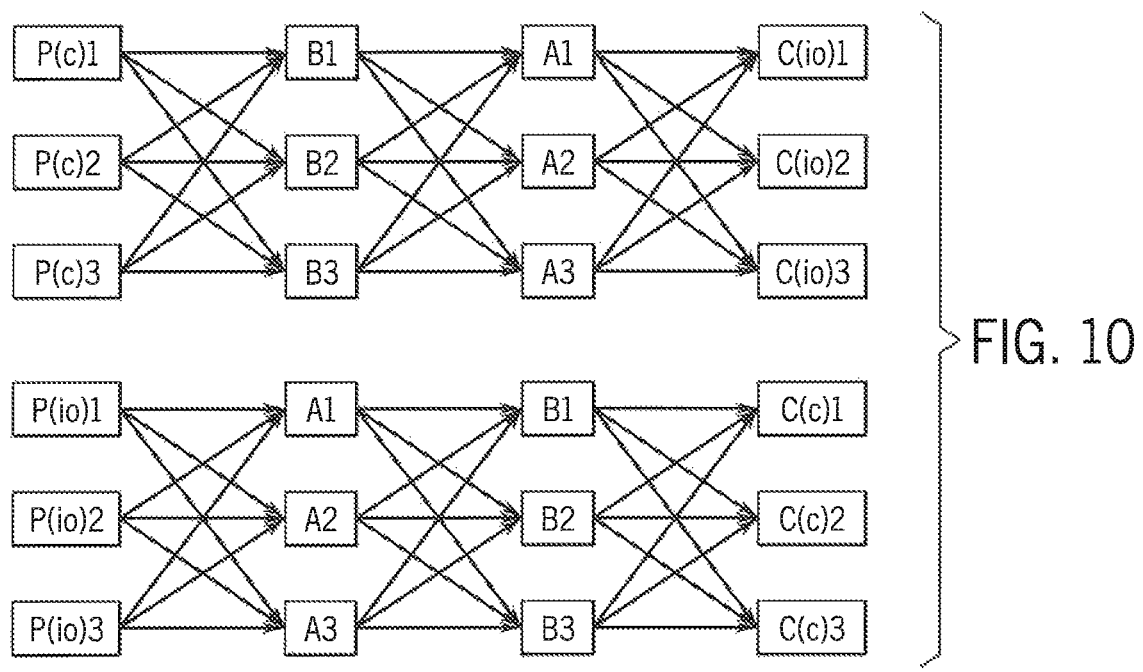
FIG. 10 is a runtime data flow diagram representation of another embodiment of a concurrent connection established in a high availability control system with triple redundancy.

FIG. 10 shows another runtime data flow model for a concurrent connection established in a HA control system with four stages and triple redundancy in each stage. In other words, the controller chassis includes three redundant controllers 25 and three redundant network bridge modules 30. The remote chassis includes three redundant I/O modules 110 and three redundant network adapter modules 90. Similarly, a triple redundant network infrastructure 70 is established between the controller chassis and the remote chassis. In this case, there are eighty-one end-to-end paths that can be used for data transfer. In general, if there are "n" stages, R1 is the number of redundant modules in stage 1, R2 is the number of redundant modules in stage 2, and Rn is the number of redundancy in stage n, then the total number of end-to-end paths in the HA control system is equal to R1×R2× . . . ×Rn. For the specific case in which all "n" stages have the same number of redundant modules, then this expression simplifies to $R^n$. In other words, the number of end-to-end paths available for data transfer grows exponentially with the number of stages and the number of redundant modules in each stage.

One aspect of establishing a concurrent connection is the establishment of redundant end-to-end data paths between end modules in a single connection. If a similar operation were desired using the prior art connections of FIG. 3, significant extra resources would be required. With reference, for example, to the system illustrated in FIG. 8, each controller 25 as an originator module would need to first identify all end-to-end paths available between itself and the target modules. In the illustrated embodiment, each controller 25 will then be required to open eight standard connections from itself to the I/O modules 110 as target modules, resulting in sixteen standard connections between the redundant controllers 25 and redundant I/O modules 110.

Implementing multiple standard connections to create redundant communication paths includes a number of drawbacks. Assuming that all of the modules and end-to-end paths are active along the sixteen standard connections, each end module needs to allocate eight sets of resources, where one set of resources corresponds to each of the eight standard connections. Each end module needs to transmit or receive eight data packets, where one data packet is transmitted on each of the eight standard connections for each data production cycle. Each intermediate module needs to receive and transmit all of the data packets passing through that intermediate for each data production cycle as well. Finally, each consumer end module needs to identify and drop up to seven duplicate data packets for every data production cycle.

On the other hand, using multiple standard connections to create redundant communication paths allows all available end-to-end data paths to be opened and all resources allocated as part of connection open process so there is no risk of runtime failure to allocate resources. In general, the number of resources required and the number of data packets that need to be processed at runtime to create redundant communication paths using multiple standard connections are dependent on both the number of stages and the number of redundant modules in each stage.

In contrast, one concurrent connection encompasses all sixteen of the end-to-end paths defined in these standard connections. Establishing the concurrent connection to encompass each of these end-to-end paths will be discussed again with respect to the system illustrated in FIG. 8. In contrast to the standard connection, which defines end-to-end data paths, the concurrent connection defines per hop connections. Per hop connections are identified and opened by all modules which are part of a concurrent connection on a hop-by-hop basis. A per hop connection refers to the connection on the local data path from an upstream module to an immediate downstream module. Controller 1 will open per hop connections to Bridge 1 and Bridge 2, Bridge 1 will open per hop connections to Adapter 1 and Adapter 2, and so on. A total of twelve per hop connections are opened on local data paths compared to sixteen standard connections for end-to-end paths as previously discussed. All twelve per hop connections form part of a single concurrent connection identified with a single concurrent connection serial number.

In contrast to the eight sets of resources required for separate end-to-end connections, each module needs to allocate only one set of resources with some minor additional overhead. In addition, each module needs to send and/or receive only two data packets per data production cycle. For example, referring to FIG. 9, each controller 25 as a producer sends two copies of the same data packet to each of the two network bridge modules 30 at the end of the hop. Only the first non-erroneous data packet received by a network bridge module 30 is forwarded on to each of the two network adapter modules 90 in a downstream hop. Any duplicate data packets received by the network bridge module are dropped at a low level without consuming a lot of CPU bandwidth. In the data flow model of FIG. 9, only two redundant modules exist per stage. Therefore, the network bridge module 30 will forward the first non-erroneous data packet received and drop the second packet received as duplicative. In the data flow model of FIG. 10, three redundant modules exist per stage. Therefore, the network bridge module 30 would forward the first non-erroneous data packet received and drop the second and third packets received as duplicative.

Similarly, only the first non-erroneous data packet received by a network adapter module 90 is forwarded on to each of the two I/O modules 110 as consumer modules in still another downstream hop. Any duplicate data packets received by a network adapter module 90 are dropped at a low level without consuming a lot of CPU bandwidth. Similarly, only the first non-erroneous data packet received by each of the I/O modules 110 is processed. Any duplicate data packets received by the I/O module 110 are dropped at a low level without consuming a lot of CPU bandwidth. Data flow in the reverse direction is also handled in a similar manner with the I/O modules 110 becoming the producer modules and the controllers 25 becoming the consumer modules. In short, each module in FIG. 8 needs to process only two data packets if a concurrent connection defines the redundant communication paths in comparison to eight data packets processed per module if separate end-to-end connections define the redundant communication paths The concurrent connection enjoys the advantages of separate end-to-end connections without the associated drawbacks. All possible end-to-end data paths are active to transmit data in the absence of faults with the per hop configuration just as with separate end-to-end connections. When a fault happens in a local data path, only the associated hop connection needs to be closed. While multiple data paths between the producer and consumer may be affected because of a single, local data path fault (i.e., due to closing the per hop connection), the impact is the same as if the same fault occurred with separate end-to-end connections defined. However, if multiple separate end-to-end connections are defined, multiple connections would need to be closed. When a fault happens in a module, multiple upstream and/or downstream hop connections may need to be closed. However, as long as one controller 25, one I/O module 110, and one data path between them are active, control can be maintained on a concurrent connection.

Figure 11:
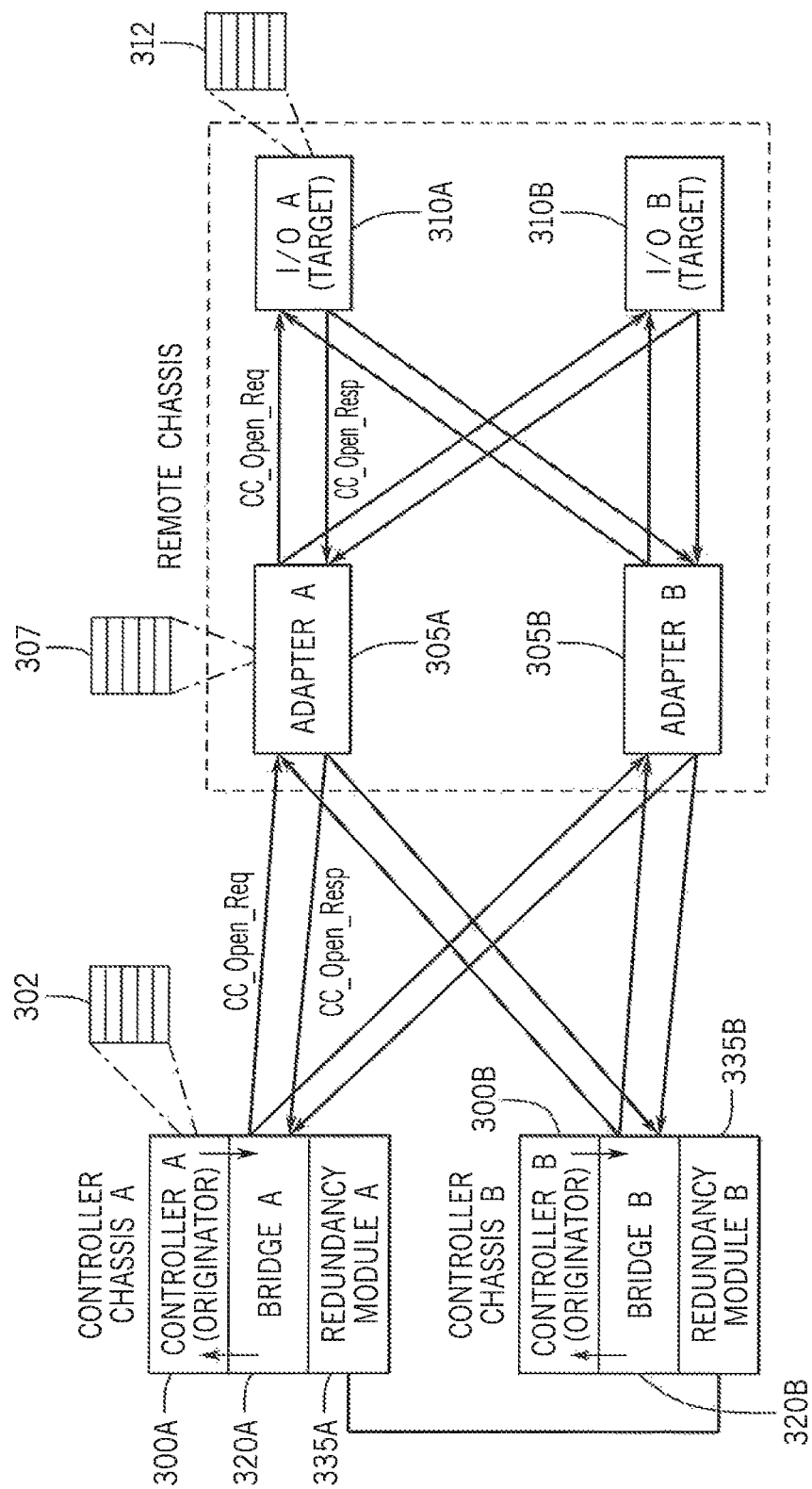
FIG. 11 is flow diagram illustrating message flow between modules for a concurrent connection open process in an exemplary high availability control system.

A more detailed description of the concurrent connections will now be provided. FIG. 11 shows the message flow model for a concurrent connection open process in an exemplary HA control system for a single concurrent connection. It should be noted that FIG. 11 only shows message flow and not all physical arrangements such as network infrastructure, backplanes, and the like. According to the illustrated embodiment, two controller chassis, Controller Chassis A and Controller Chassis B, are configured in a dual chassis redundancy mode. Each controller chassis includes a controller 300, a bridge module 320, and a redundancy module 335. Controller Chassis A contains Controller A 300A and Bridge A 320A. Controller Chassis B contains Controller B 300B and Bridge B 320B. There is a remote chassis with two adapter modules 305, Adapter A 305A and Adapter B 305B, and two I/O modules 310, I/O module A 310A and I/O module B 310B. In addition, there are two redundancy modules, Redundancy Module A 335A and Redundancy Module B 335B, where one redundancy module is located in each controller chassis. The redundancy modules 335 are provided to facilitate communication between Controller A 300A and Controller B 300B. Each controller 300 includes a stored user control program which contains information such as control tasks to be executed, user routines that are part of those tasks, and the information for all concurrent connections that need to be created. The stored information for a concurrent connection includes parameters such as connection type, data size to transfer in each direction, duration of a periodic interval at which the message is to be transmitted, connection timeout duration, and logical path information for all modules that are part of the concurrent connection. The two controllers 300 are connection originators and are establishing a concurrent connection with the two I/O modules 310, which are connection targets during the concurrent connection open process.

The two controllers 300 open concurrent connections as part of a startup process for the user control program stored in each controller. Before opening a concurrent connection, the two controllers 300 exchange connection information with each other and generate a globally unique concurrent connection serial number for each concurrent connection. The unique serial numbers for each concurrent connection are stored in each controller and are utilized during the connection open request.

To open a concurrent connection, each of the two controllers 300 first allocate resources for a per hop connection from the controller 300 to the bridge 320 on their respective chassis. The information about those allocated resources is stored along with concurrent connection parameters into a per concurrent connection control data structure (e.g., the table identified by reference numeral 302 for Controller A 300A). Then the two controllers, Controller A 300A and Controller B 300 B, each send a concurrent connection open request message, CC_Open_Req, to Bridge A 320A and Bridge B 320B, respectively, over the backplane to the bridge module 320 located on the respective controller chassis.

FIG. 12 shows the message format for a concurrent connection open request. The message packet contains one or more backplane or network specific header(s) as required for the communication mediums over which the message packet is transmitted. The backplane or network specific headers are followed by an industrial protocol header, which includes message type information indicating, for example, that the message packet is a concurrent connection open request. The message packet then includes connection parameters and a packet CRC. The connection parameters include information such as the globally unique concurrent connection serial number, connection type, data size to transfer in each direction, duration of a periodic interval at which the message is to be transmitted, connection timeout duration, and the logical path defining each of the modules that are part of connection. Table 1, included below, provides exemplary logical path information to downstream modules that may be encoded in the connection parameters for the concurrent connection open request. Each controller 300 includes a complete set of addresses for which per hop connections are to be established in a concurrent connection. In addition to the information included below, the controller 300 would also have parameters defining whether bridge modules 320 are included and, if so, how many and at what logical address they are located. The controller 300 establishes the per hop connection to each bridge module 320 and passes the information for the adapter modules 305 and the I/O modules 310 to the bridge modules in the concurrent connection open request message. Each bridge module 320 will establish the per hop connection to each adapter module 305 and passes the information for the I/O modules 310 to the adapter modules in the concurrent connection open request message. Thus, as each per hop connection is established, information for the subsequent per hop connections are passed along in the concurrent connection open request message.

TABLE 1

Exemplary Logical Path Information for a Concurrent Connection Open Request

| Module | Encoded Logical Addresses | Description |
|---|---|---|
| Adapter | 2: | Number of adapters: |
|  | 192.168.1.101; | Network address of adapter A; |
|  | 192.168.1.201 | Network address of adapter B |
| I/O | 2; | Number of I/O modules: |
|  | 5; | Backplane slot address of I/O A; |
|  | 6 | Backplane slot address of I/O B; |

Referring back to FIG. 11, when each of the two bridge modules 320 receive the concurrent open request message from the respective controller 300, each bridge module 320 will save information about the sender of the message and all connection parameters, including the unique concurrent connection serial number, that were part of the message into a per concurrent connection control data structure within the bridge module. Each bridge module 320 will then allocate resources for per hop connections to the upstream controllers 300 and for per hop connections to the two downstream adapter modules 305. The information for each of these allocated resources will be saved into the per concurrent connection control data structure. Each bridge module 320 will then send a concurrent open request message to the two downstream adapter modules 305 over the network to establish the next per hop connection.

Each adapter module 305 will, in turn, receive two concurrent connection open request messages, one from each upstream bridge module 320. Due to the serial transmission nature of network communication, the two concurrent connection open request messages will be received by each adapter module 305 at different times. When each adapter module 305 receives the first concurrent open request message from an upstream bridge module 320, it will save information about the sender of the message and all connection parameters, including the unique concurrent connection serial number, that were part of the message into a per concurrent connection control data structure (e.g., the table identified by reference numeral 307 for Adapter A 305A). Each adapter module 305 will then allocate resources for a per hop connection to the upstream bridge modules 320 and for per hop connections to the two downstream I/O modules 310. The information for each of these allocated resources will be saved into the per concurrent connection control data structure. Each adapter module 305 will then send a concurrent open request message to the two downstream I/O modules 310 over the backplane on the remote chassis to establish the next per hop connection.

When each adapter module 305 receives the second concurrent open request message from the upstream bridge modules 320, the adapter module 305 compares the globally unique concurrent connection serial number in the second open request message received with the concurrent connection serial number from the first open request message that has been saved in the per concurrent connection control data structure. When the concurrent connection serial number matches a previously stored serial number, the adapter module 305 identifies this message as a redundant message, and the adapter module 305 will join the second connection open request message to the saved concurrent connection information in the per concurrent connection control data structure by adding the second sender information to the concurrent connection information and will use the resources already allocated for upstream and downstream per hop connections. Thus, as each module receives redundant concurrent connection open requests from upstream modules, the module will identify each upstream hop to which it is connected but will only forward a single concurrent connection open request (rather than forwarding each of the concurrent connection open requests) to each of the further downstream modules to which the module is to establish a downstream hop connection.

Each I/O module 310 will next receive two concurrent connection open request messages, one from each upstream adapter module 305. Due to the serial transmission nature of backplane communication, the two concurrent connection open request messages will be received by each I/O module 310 at different times. When each I/O module 310 receives the first concurrent open request message from an upstream adapter module 305, it will save information about the sender of the message and all connection parameters, including the unique concurrent connection serial number, that were part of the message into a per concurrent connection control data structure (e.g., the table identified by reference numeral 312 for I/O module A 310A). Note, only three concurrent connection control data structures are illustrated for convenience. Nevertheless, it is understood that each module within the concurrent connection will maintain its own concurrent connection control data structure. Each I/O module 310 will then allocate resources for a per hop connection to the upstream adapter modules 305 and save information about those resources into a per concurrent connection control data structure. Each I/O module 310 will then mark the concurrent connection status as open and will mark the hop path from the first upstream adapter module 305 as open. After establishing the concurrent connection as open, each I/O module 310 will generate and send a concurrent connection open response message with a success status to the first upstream adapter module 305 from which it received the connection open request over the backplane on the remote chassis.

When each I/O module 310 receives the second concurrent open request message from the upstream adapter modules 305, the I/O module 301 compares the globally unique concurrent connection serial number in the second open request message received with the concurrent connection serial number from the first open request message that has been saved in the per concurrent connection control data structure. When the concurrent connection serial number matches a previously stored serial number, the I/O module 310 identifies this message as a redundant message, and the I/O module 310 will join the second connection open request message to the already open concurrent connection by adding the second sender information to the saved information in the per concurrent connection control data structure. The I/O module 310 will use the resources already allocated for the upstream per hop connection to the first adapter module 305 and will mark the hop path from second upstream adapter as open. The I/O module 310 will then send a concurrent connection open response message with a success status to the second upstream adapter module 305 from which it received the connection open request over the backplane on the remote chassis.

When an upstream adapter module 305 receives the first concurrent connection open response message with a success status from a first of the two downstream I/O modules 310, the adapter module 305 will mark the concurrent connection status as open and will mark the hop path from that downstream I/O module 310 as open. The adapter module 305 will then, in turn, send a concurrent connection open response message with a success status to both upstream bridge modules 320 over the network infrastructure. When the adapter module 305 receives the second concurrent connection open response message with a success status from the second downstream I/O module 310, the adapter module 305 will mark the hop path from that downstream I/O module 310 as open.

When an upstream bridge module 320 receives the first concurrent connection open response message with a success status from a first of the two downstream adapter modules 305, the bridge module 320 will mark the concurrent connection status as open and will mark the hop path from that downstream adapter module 305 as open. The bridge module 320 will then, in turn, send a concurrent open response message with a success status to the upstream controller, over the backplane within the respective chassis.

When the bridge module 320 receives the second concurrent connection open response message with a success status from the second downstream adapter module 305, the bridge module 320 will mark the hop path from that downstream adapter module 305 as open.

When an upstream controller 300 receives a concurrent connection open response message with a success status from a downstream bridge module 320, the controller 300 will mark the concurrent connection status as open and will mark the hop path from that downstream bridge module 320 as open. The concurrent connection is thus now open and is ready to transfer data.

FIG. 13 shows the message flow model for a concurrent connection open process in another exemplary HA control system for a single concurrent connection. It should be noted that FIG. 13 only shows message flow and not all physical arrangements such as network infrastructure, backplanes, and the like. In the embodiment shown in FIG. 13, the two controllers 315, Controller A 315A and Controller B 315B, are in single chassis redundancy mode. The two controllers are capable of directly communicating with each other via a backplane and directly communicating with the adapter modules 305 on the network rather than utilizing bridge modules. The rest of the HA control system is configured similar to the one shown in FIG. 11 and described above. The two controllers 315 are connection originators and are establishing a concurrent connection with the two I/O modules 310, which are connection targets during the concurrent connection open process. In this embodiment, the controllers 315 will directly send a concurrent connection open request message to each of the two adapter modules 305 as the first hop. The connection open process proceeds in same way to the I/O modules 310 and back as described earlier with respect to FIG. 11 except that a concurrent connection open response message will be sent directly from the adapter modules 305 to the controllers 315. When an upstream controller 315 receives a first concurrent connection open response message with a success status from one of the downstream adapter modules 305, it will mark the concurrent connection status as open and will mark the hop path from that downstream adapter module as open. When an upstream controller 315 receives a second concurrent connection open response message with a success status from the other of the downstream adapter modules 305, it will mark the hop path from that downstream adapter module as open. The concurrent connection is thus now open and is ready to transfer data.

When a module receiving the concurrent connection open request cannot allocate resources for the request or cannot open the connection for any other reason, the module at which the concurrent connection open request failed will send a concurrent connection open response message with a failure status to the upstream module that sent the concurrent connection open request message. When an upstream module receives a concurrent connection open response message with a failure status from a downstream module, it will mark the hop path from that downstream module as failed.

All modules start a concurrent connection open request message timer with an appropriate timeout duration when they send a concurrent connection open request message to another module along a hop path. If a concurrent connection response message is not received from the downstream module with either a success or a failure status, the request message timer on the upstream module that sent the open request message will eventually time out. The upstream module will then mark the hop path from that downstream module as failed.

When a module identifies that all downstream hop paths for a concurrent connection are marked as failed, it will send concurrent connection open response message with a failure status to all of its immediate upstream modules. The module that identified the failed downstream hop paths will then close the concurrent connection, free the allocated resources, and delete all information stored in the per concurrent connection data structure for the failed concurrent connection. When per hop connections are open on at least one path between each end of the concurrent connection, the concurrent connection will stay open. As long as the concurrent connection is open, it is the responsibility of an upstream module to periodically try to open a per hop connection on a failed or closed hop path using the saved connection parameters. When a concurrent connection is not open it is the responsibility of a controller to periodically try to open a concurrent connection using the saved connection parameters.

Figure 14:
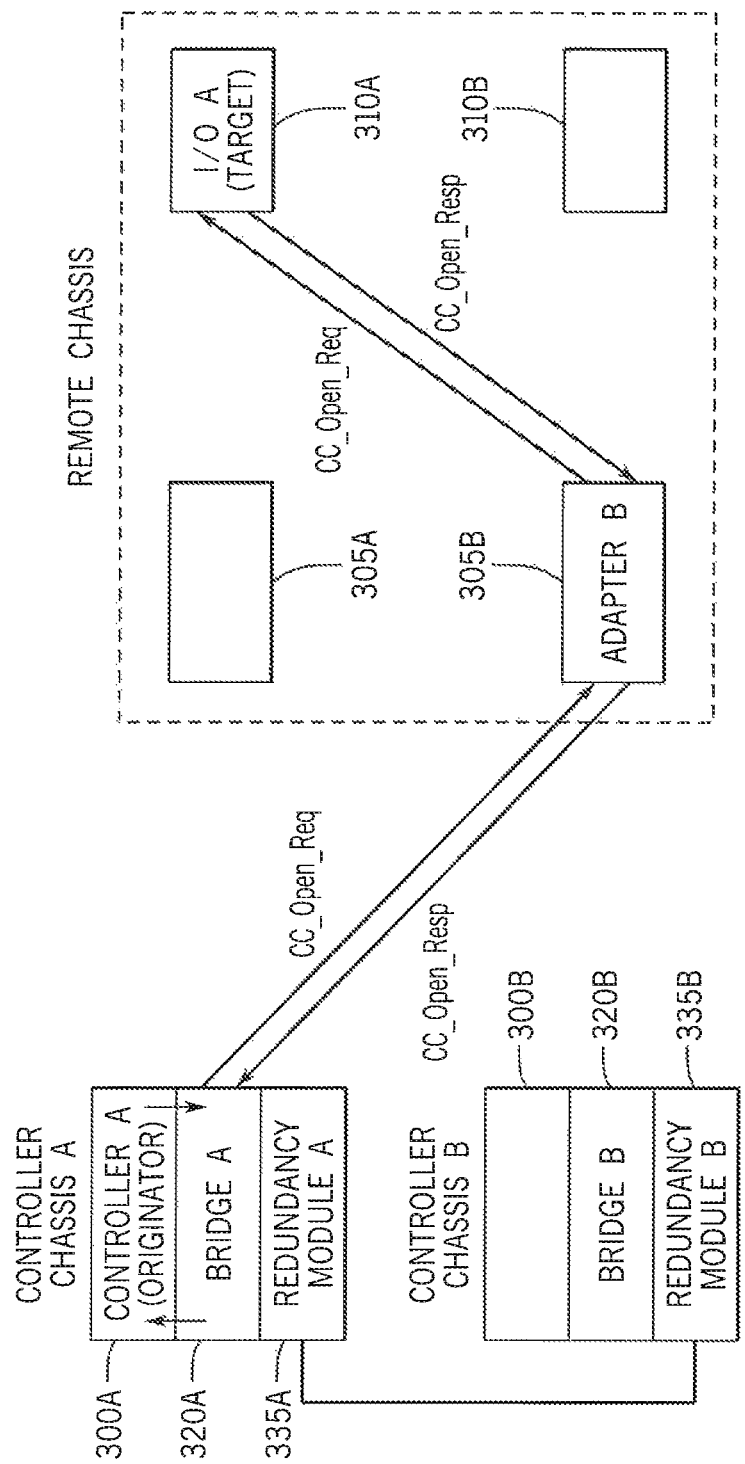
FIG. 14 is a flow diagram illustrating message flow between modules for a concurrent connection open process in the exemplary high availability control system of FIG. 11 when a portion of the modules have failed or are missing.

Turning next to FIG. 14, a message flow model of an exemplary concurrent connection open request message is shown in a HA control system with multiple failures. The HA control system illustrated in FIG. 14 is identical to the system illustrated in FIG. 11; however, Controller B 300B, Adapter A 305A, I/O module B 310B have either failed or are not present during the concurrent connection open process. The concurrent connection open process proceeds as described above with respect to FIG. 11 with some changes to accommodate the failed modules, which will now be described.

In the absence of Controller B 300B, Controller A 300A will generate a globally unique concurrent connection serial number for a concurrent connection by itself and will provide the unique serial number to Controller B 300B when it comes online later. Because Controller B 300B is absent or has failed, the concurrent connection open request message will not be sent from Controller B to Bridge B 320B or to any other downstream paths from the absent controller B. Similarly, since Adapter A 305A is absent, it will not send the concurrent connection open request messages to either of the two downstream I/O modules 310. While Bridge A 320A will send the concurrent connection open request messages to each of the two adapter modules 305, Bridge A 320A will not receive a concurrent connection open response message from Adapter A 305A because the adapter module is absent. Similarly, Adapter B 305B will send the concurrent connection open request messages to each of the two I/O modules 310, but Adapter B 305B will not receive a concurrent connection open response message from the absent I/O module B 310B. Eventually the concurrent connection open request message timer, described above, on Bridge A 320A and Adapter B 305B will generate a timeout indication for the hop paths they attempted to establish but for which the concurrent response message is not received. This will result in Bridge A 320A and Adapter B 305B marking those hop paths as failed. However, the concurrent connection open response message with a success status will be received by Adapter B 305B from I/O module A 310A, by Bridge A 320A from Adapter B 305B, and by Controller A 300A from Bridge A 320A, resulting in those per hop connections to be open. The concurrent connection is able to open on one active path between the originator and the target and is ready to transfer data. When any of the missing modules come online later, the upstream modules will retry opening the per hop connections to the immediate downstream modules as described earlier, and these per hop connections will be added to the existing concurrent connection. As individual modules and the resulting per hop paths are restored, additional paths of the concurrent connection become active.

Though the description with respect to FIG. 14 focused only on module failures, communication failure due to faults in network infrastructure 70 and backplanes will also result in similar behavior since the concurrent connection open request message will not reach a downstream module. To the module sending the concurrent connection open request, a failure in a module or a failure in the transmission medium will appear the same. A failure in the transmission medium appears as an absent module from either communication direction. For example, from a downstream module perspective, a failure in the transmission medium appears the same as when an upstream module is absent. Similarly, from an upstream module perspective the communication failure will look the same as when a downstream module is absent. Eventually the concurrent connection open request message timer described earlier will generate a timeout indication on an upstream module attempting to establish a hop path in which a concurrent response message is not received, and the upstream module will mark that hop path as failed.

Figure 15:
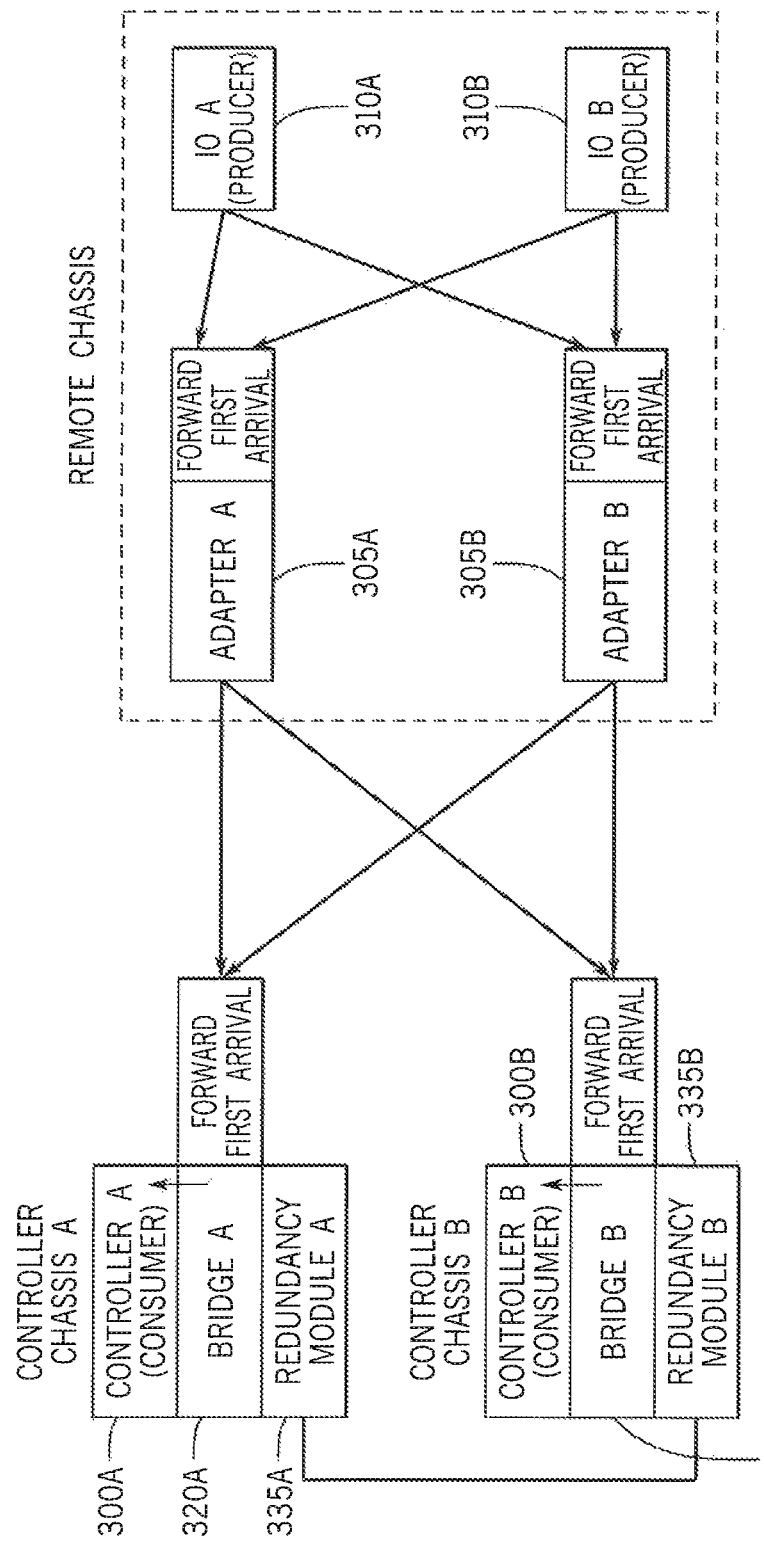
FIG. 15 is a flow diagram illustrating message flow in a first direction for modules in the high availability control system of FIG. 11 during run time operation utilizing a concurrent connection according to one embodiment of the invention.
Figure 16:
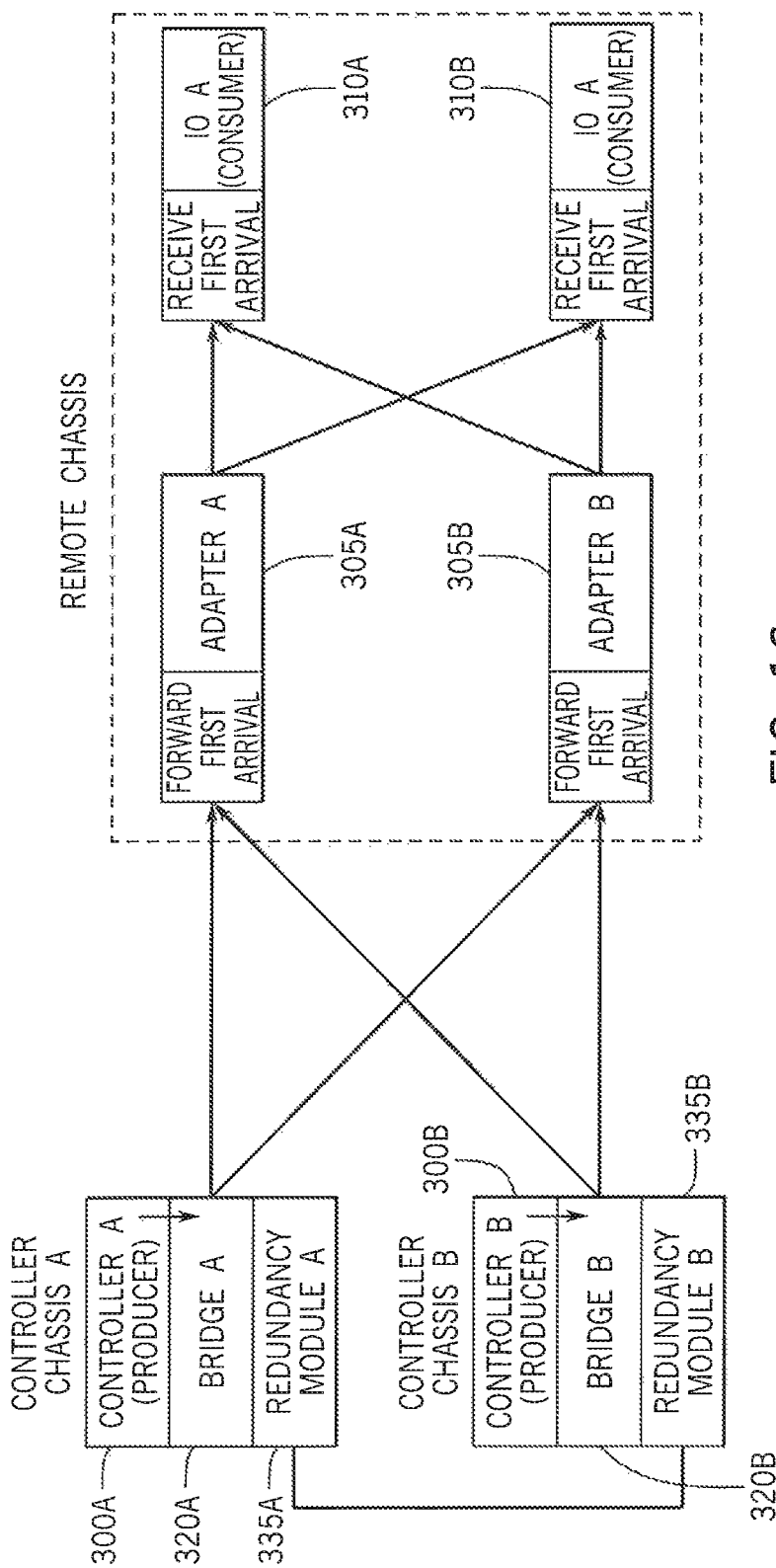
FIG. 16 is a flow diagram illustrating message flow in a second direction for modules in the high availability control system of FIG. 11 during run time operation utilizing a concurrent connection according to one embodiment of the invention, where the second direction is opposite the direction shown in FIG. 15.

The runtime behavior of concurrent connections will now be described. FIGS. 15 and 16 together show bidirectional data flow model in a single concurrent connection during runtime in a HA control system with dual chassis controller redundancy. FIG. 15 shows the HA control system discussed above with respect to FIG. 11 and further illustrates data flow to transfer input signals of controlled devices received at the input modules 310 to the controllers 300 in one direction of the concurrent connection previously opened. FIG. 16 shows data flow from the controllers 300 to transfer output signals for controlled devices to the I/O modules 310 in the other direction of the concurrent connection. It should be noted that FIGS. 15 and 16 only show data flow and not all physical arrangements such as the network infrastructure, backplanes, and the like. FIG. 15 shows the I/O modules 310 acting as data producers and the controllers 300 acting as data consumers for data flow in one direction, and FIG. 10 shows the controllers 300 acting as data producers and the I/O modules 310 acting as data consumers for data flow in the other direction. For discussion herein, it will be assumed that the concurrent connection type is cyclical, meaning data will be produced by both the I/O modules 310 and the controllers 300 at periodical intervals for transmission in both directions.

It should be noted that in following description for the data flow model discussed with respect to runtime operation the terms upstream and downstream are used with respect to the direction of data flow from a producer to a consumer and will not always match with use of those terms in the concurrent connection open process from an originator to a target as discussed above. Referring now to FIG. 15, for every data production cycle, an IO application layer task executing on each of the redundant I/O modules 310, I/O module A 310A and I/O module B 310B, on the remote chassis will sample input signals from the controlled devices. The IO application layer task executing on each of the redundant I/O modules 310 will then exchange sampled input data with each other and reach an agreement on data to produce and an associated data sequence number to use during the current data production cycle. The IO application layer task in each redundant I/O module 310 will then provide the same agreed upon data and sequence number to a concurrent connection layer executing on the redundant I/O module 310 along with the unique concurrent connection identifier for data production. The concurrent connection layer on a redundant I/O module 310 will use the unique concurrent connection identifier for each concurrent connection to find the per concurrent connection control data structure stored on that module.

Figure 17:
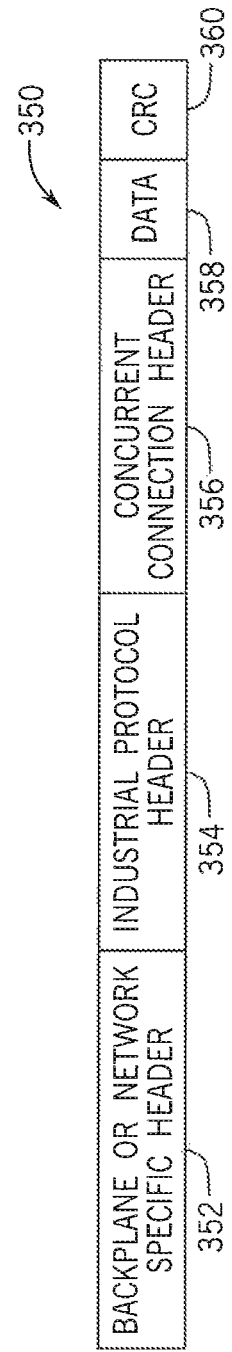
FIG. 17 is a block diagram representation of an extended network segment format of a data message for use in a concurrent connection according to one embodiment of the invention.

The concurrent connection layer will then build a concurrent connection data packet for the given concurrent connection and send it to downstream adapter modules 305, Adapter A 305A and Adapter B 305B, over the backplane in the remote chassis. FIG. 17 shows the format of a concurrent connection data packet 350 according to one embodiment of the invention. The concurrent connection data packet 350 contains one or more backplane or network specific header(s) 352, as required for the communication medium on which the data packet 350 is to be transmitted, followed by an industrial protocol header 354, which includes information such as the packet type, a hop connection identifier, and the like. The protocol header 354 is followed by a concurrent connection header 356, data 358, and, lastly, a packet CRC 360. The concurrent connection header 356 includes information such as the unique concurrent connection serial number, the data sequence number generated by the application layer task, and a separate CRC determined as a function of the data in the concurrent connection header 356 and the data payload 358. This separate CRC in the concurrent connection header is used to ensure integrity of the concurrent connection header and the data from producer to consumer. The final, packet CRC 360 is used during communication on a network or a backplane on a hop-by-hop basis.

Referring back to FIG. 15, when an adapter module 305 receives a concurrent connection data packet 350 from an upstream I/O module 310 over the backplane, the adapter module 305 will verify the separate CRC present in the concurrent connection header 356 is valid. If the CRC check on the separate CRC fails, the adapter module 305 will drop the concurrent connection data packet 350. If the separate CRC check passes, then the adapter module 305 will use the hop connection identifier and concurrent connection serial number in the data packet 350 to identify the hop connection from which it received the data packet and the corresponding per concurrent connection control data structure stored on the adapter module 305. The adapter module 305 will then check if the data sequence number in the data packet 350 is newer than a value of a data sequence number stored in the concurrent connection control data structure. If the sequence number is a duplicate to the stored value or is older than the stored value, the adapter module 305 will drop the data packet 350. If the sequence number is newer than the prior stored value, the adapter module 305 will store that the new sequence number in the concurrent connection control data structure, and build data packets for transmission to each of the two downstream bridge modules 320 over the network.

This procedure defines a forward first arrival scheme for the adapter module 305. In other words, the adapter module 305 will only forward the first concurrent connection data packet 350 received from each I/O module with the same data. The adapter module 305 is indifferent whether the data packet 350 is received from I/O module A or I/O module B, but rather is only concerned that the first packet of the two packets is retransmitted to the next hop, while the second, or any additional redundant data packets are dropped.

When a bridge module 320 receives a concurrent connection data packet 350 from an upstream adapter module 305 over the network, the bridge module 320 will follow the same process as described above for the adapter modules 305 receiving a concurrent connection data packet from the I/O modules 310. If all checks pass in the bridge module 320, then the bridge module 320 will, in turn, build and send concurrent connection data packets to the downstream controller 300, over the backplane in the local chassis.

When a controller 300 receives a concurrent connection data packet 350 from an upstream bridge module 320, the controller 300 will follow the same process as described above for receiving a concurrent connection data packet from an upstream module. If all checks pass, then the controller 300 will provide the data and sequence number to an application layer task executing in the controller 300. The application layer tasks in each of the two controllers 300 will exchange the data and sequence number received by one controller with the other controller and will arrive at an agreed upon input data to use for a user control program executing on the controller 300.

The user control program is executing on each controller 300 and produces output data to send to the I/O modules 310. The application layer tasks executing in each of the two controllers 300 will exchange the output data produced on each controller with the other controller and will arrive at agreed upon output data and a sequence number for the output data to send to the I/O modules 310. The application layer task in each redundant controller 300 will then provide the same agreed upon data and sequence number to the concurrent connection layer along with the unique concurrent connection identifier for the concurrent connection by which the output data is to be transmitted to the I/O modules 310.

With reference next to FIG. 16, a concurrent connection data packet will be generated and transmitted from the controllers 300 as producers to the I/O modules 310 as consumers in a manner similar to that described above for the reverse direction of data transfer shown in FIG. 15. The concurrent connection layer on a redundant controller will use the unique concurrent connection identifier to find the per concurrent connection control data structure stored on that module build a concurrent connection data packet 350 for the given concurrent connection, and send the data packet to the downstream bridge modules 320 over backplane. When a bridge module 320 receives a concurrent connection data packet 350 from an upstream controller 300, the bridge module 320 will follow the same process as described above for the forward first arrival scheme, accepting the first concurrent connection data packet 350 with a particular sequence number and dropping any redundant data packet. If all checks pass, then the bridge module 320 will build and send concurrent connection data packets to each of the two downstream adapter modules 305 over the network. When an adapter module 305 receives a concurrent connection data packet from an upstream bridge module 320 over the network, the adapter module 305 will also follow the forward first arrival scheme, accepting the first concurrent connection data packet 350 with a particular sequence number and dropping any redundant data packet. If all checks pass, then the adapter module 305 will build and send concurrent connection data packets to each of the two downstream I/O modules 310 over the backplane. When an I/O module 310 receives a concurrent connection data packet from an upstream adapter module 305 over the backplane, the I/O module 310 will similarly follow the receive first arrival scheme, accepting the first concurrent connection data packet 350 with a particular sequence number and dropping any redundant data packet. If all checks pass, then each I/O module 310 will provide the data and sequence number to an application layer task executing in the I/O module. The application layer tasks in each I/O module 310 will exchange the data and sequence number received at that I/O module with the data and sequence number received at the other I/O module and will arrive at agreed upon output data to use for providing output signals to each of the controlled devices. The application layer tasks in each of the redundant I/O modules 310 will then apply the agreed upon output data to terminals o the I/O modules as output signals to control operation of the controlled devices. Thus, the process of bidirectional data transfer is carried out for each production cycle.

Figure 18:
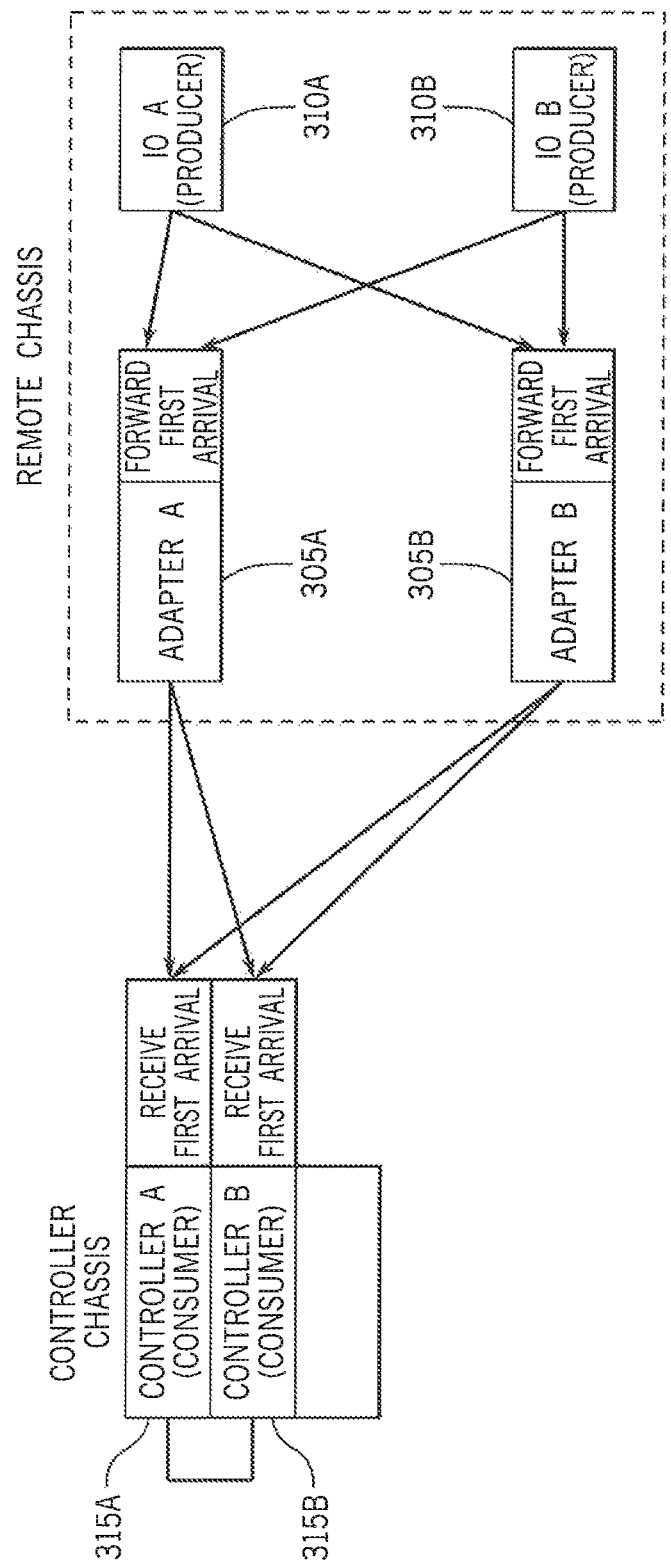
FIG. 18 is a flow diagram illustrating message flow in a first direction for modules in the high availability control system of FIG. 13 during run time operation utilizing a concurrent connection according to one embodiment of the invention.
Figure 19:
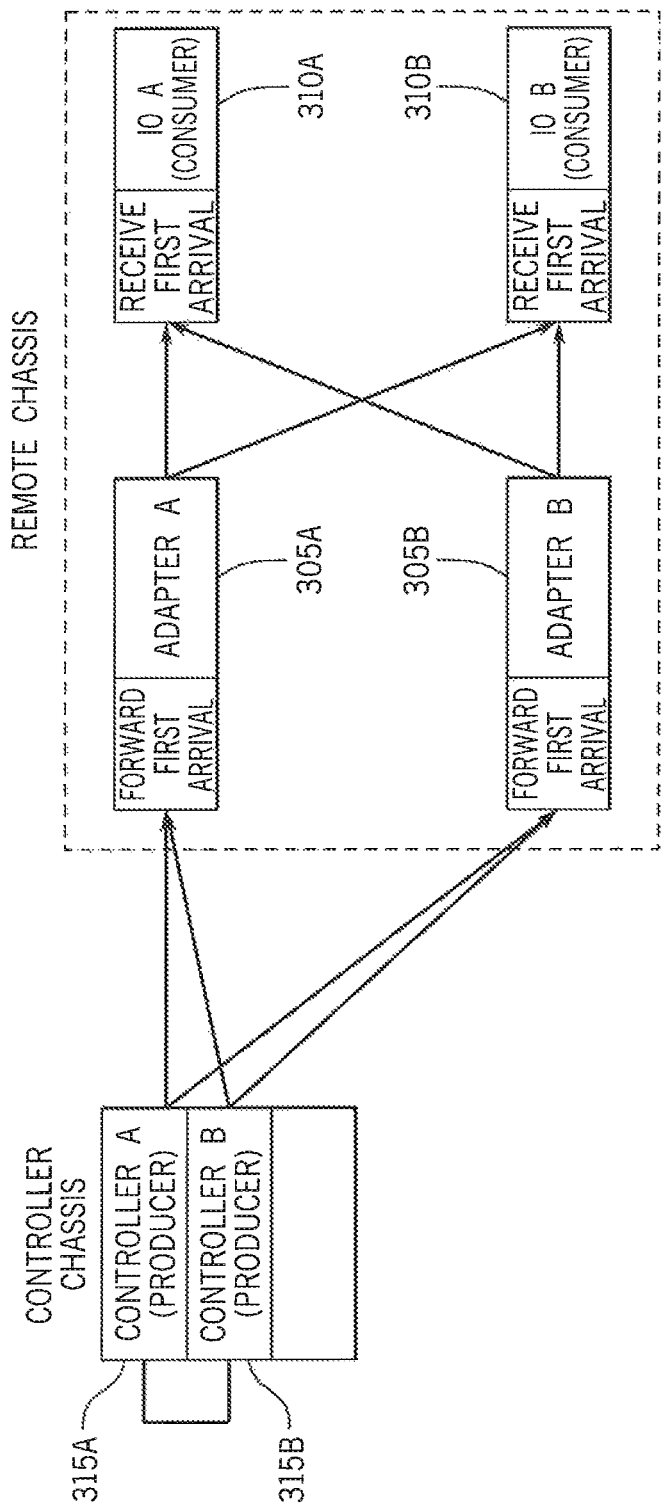
FIG. 19 is a flow diagram illustrating message flow in a second direction for modules in the high availability control system of FIG. 13 during run time operation utilizing a concurrent connection according to one embodiment of the invention, where the second direction is opposite the direction shown in FIG. 18.

FIGS. 18 and 19 together show bidirectional data flow model in a single concurrent connection during runtime in the HA control system with single chassis controller redundancy previously discussed in FIG. 13. FIG. 18 shows data flow from I/O modules 310 receiving input signals of controlled devices to controllers 315 in one direction and FIG. 19 shows data flow from controllers 315 providing output signals to the I/O modules 310 to control operation of the controlled devices in the other direction. It should be noted that FIGS. 18 and 19 only show data flow and not all physical arrangements such as the network infrastructure, backplanes, and the like. FIG. 18 shows the I/O modules 310 acting as data producers and the controllers 315 acting as data consumers for data flow in one direction. FIG. 19 shows the controllers 315 acting as data producers and the I/O modules 310 acting as data consumers for data flow in the other direction. The bidirectional data transfer process proceeds in the same manner as described above for the dual chassis redundancy case illustrated in FIGS. 15 and 16. In this embodiment, controllers 315 directly transmit concurrent connection data packets 350 to or receive the data packets from adapter modules 305 over the network. Otherwise, the process of bidirectional data transfer is carried out for each production cycle in the same manner as dual chassis redundancy case.

All modules use a per hop connection receive timer to monitor data packet reception from an upstream module on an open per hop connection. This timer is started when a per hop connection is first opened. The timer executes with a connection timeout duration that is received as part of connection parameters. Whenever a valid concurrent connection data packet is received on a per hop connection, the per hop connection receive timer is restarted. When a valid concurrent connection data packet is not received on a per hop connection for a time equal to or greater than the connection timeout duration, the per hop connection timer will generate a time out event and the module executing the timer marks that per hop connection as closed. As described earlier it is the responsibility of an upstream module (from the perspective of the concurrent connection open process) to periodically try to reopen closed per hop connections. When a module identifies that all per hop connections from upstream modules are marked as closed, then it will close the concurrent connection, free the resources allocated for it, and delete all information stored in the per concurrent connection data structure.

Figure 20:
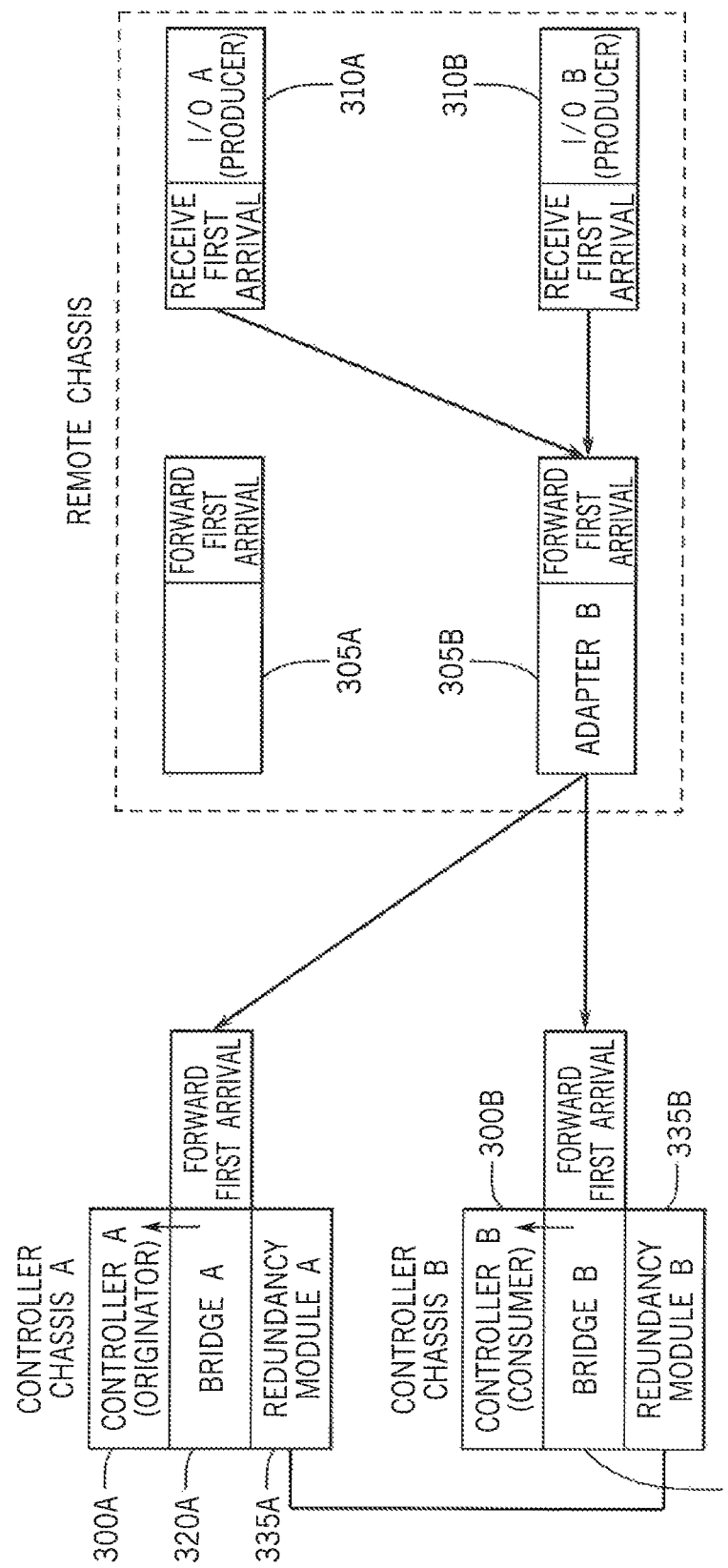
FIG. 20 is a flow diagram illustrating message flow in the first direction for modules in the high availability control system of FIG. 15 during run time operation utilizing a concurrent connection according to one embodiment of the invention with one of the adapter modules failed or removed.
Figure 21:
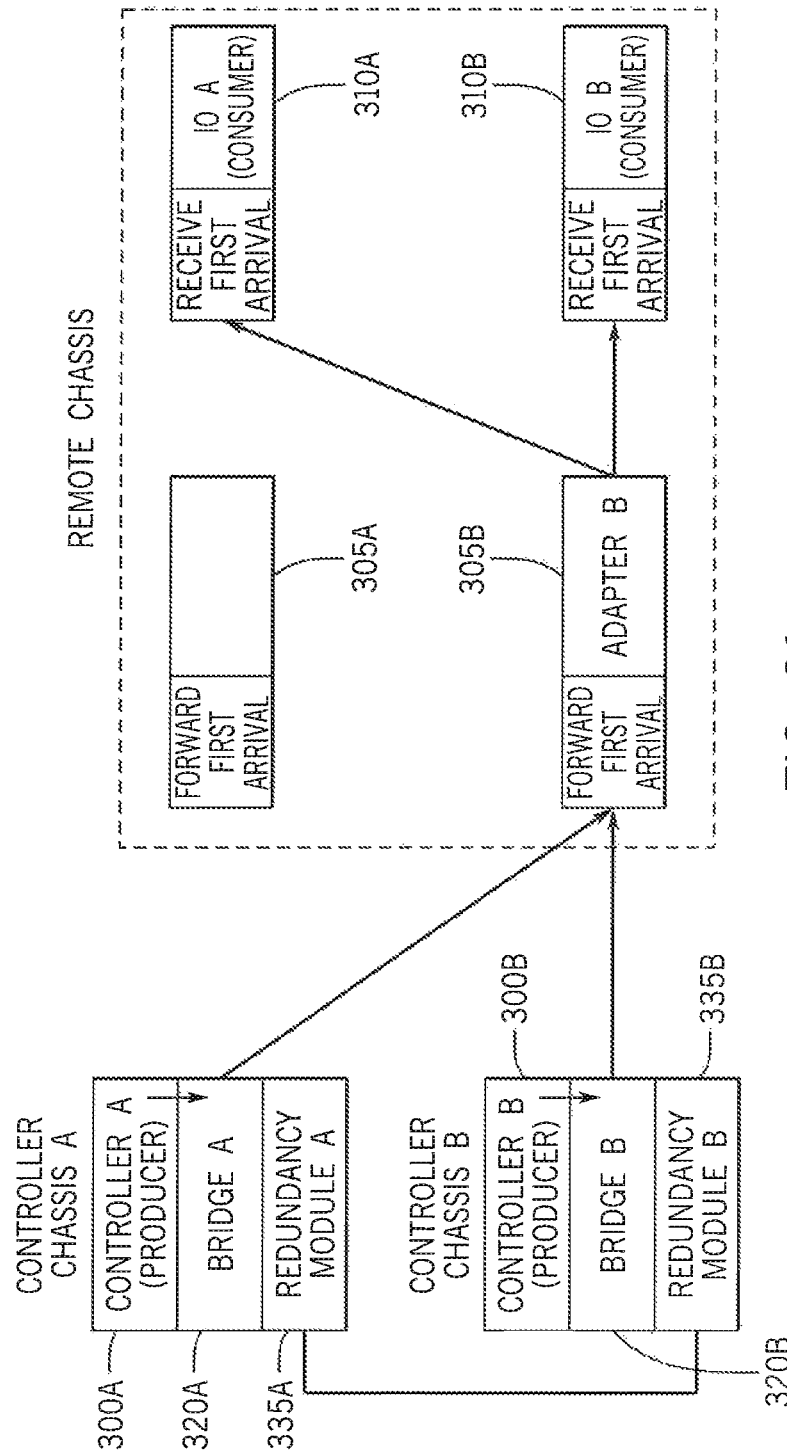
FIG. 21 is a flow diagram illustrating message flow in the second direction for modules in the high availability control system of FIG. 16 during run time operation utilizing a concurrent connection according to one embodiment of the invention with one of the adapter modules failed or removed.

FIGS. 20 and 21 show the same data flow model for a dual chassis redundancy HA control system as shown and discussed above with respect to FIGS. 15 and 16 except with the addition of a runtime fault in Adapter A 305A. Referring now to FIG. 20, when Adapter A 305A fails during runtime, the per hop connection receive timer on Bridge A 320A for concurrent connection data packets received via the per hop connection from adapter A 305A will timeout due to non-reception of the concurrent connection data packets from adapter A, and Bridge A 320A will close the per hop connection to Adapter A 305A. Similarly, Bridge B 320B will also experience a timeout on the per hop connection receive timer for concurrent connection data packets received from Adapter A 305A via its respective per hop connection and close the per hop connection to adapter B. Referring now to FIG. 21, I/O module A 310A and I/O module B 310B will similarly experience timeouts on their respective per hop connection receive timers for concurrent connection data packets received from Adapter A 305A in the other communication direction and close their respective per hop connections to Adapter A. Since Bridge A 320A and Bridge B 320B closed their respective per hop connections to Adapter A 305A, each bridge module 320 will stop sending data packets to Adapter A 305A. Similarly, since I/O module A 310A and I/O module B 310B closed their respective per hop connections to Adapter A, 305A each I/O module 310 will stop sending data packets to Adapter A. The concurrent connection will, however, remain open and continue bidirectional data transfer through the remaining per hop paths. When Adapter A 305A comes back online, Bridge A 320A and Bridge B 320B will each reopen their respective per hop connection paths to Adapter A 305A via a concurrent connection open request. Successfully re-establishing the per hop connections between the bridge modules 320 and Adapter A 305A will, in turn, cause Adapter A 305A to reopen per hop connections to each of the I/O modules 310, thus completing the recovery of concurrent connection.

Though the description above with respect to FIGS. 20 and 21 focused only on a module failure, communication failure due to faults in network infrastructure and backplanes will result in similar behavior. The modules affected by communication failure between them will experience a timeout in a per hop connection receive timer and will close the per hop connection to a module on the other side of the communication failure. The concurrent connection will continue to stay open and carrying out bidirectional data transfer through remaining per hop paths. When the communication failure disappears the upstream module with respect to the concurrent connection request process will attempt to reestablish and reopen the hop connection completing the recovery of concurrent connection.

The concurrent connection close process is done on a hop-by-hop basis in a manner similar to the concurrent connection open process. The concurrent connection originator, usually a controller, starts the concurrent connection close process by sending a concurrent connection close request message to one or more downstream modules depending on number of open per hop connections to downstream modules. The controller will then close the concurrent connection, freeing the resources allocated for it and deleting all information stored in the per concurrent connection control data structure for that connection. An intermediate module receiving a concurrent connection close request message from an upstream module will send a concurrent connection close response message with a success status to the upstream module and will, in turn, close the per hop connection to that upstream module. If the closed per hop connection was the last open upstream per hop connection, the intermediate module will also send a concurrent connection close request message to one or more downstream modules depending on number of open per hop connections to the downstream modules. The intermediate module will then close the concurrent connection, freeing the resources allocated for it and deleting all information stored in the per concurrent connection control data structure for that connection. A concurrent connection target module receiving a concurrent connection close request message from an upstream module will send a concurrent connection close response message with a success status to the upstream module and will close the per hop connection to that upstream module. If the closed per hop connection was the last open upstream per hop connection, the target module will close the concurrent connection, freeing the resources allocated for it and deleting all information stored in the per concurrent connection control data structure for that connection.

Concurrent connection diagnostics are provided to help pinpoint problem location to user. When a per hop connection is closed on a module while the concurrent connection associated with that per hop connection is still open, a diagnostic bit will be set on the module status information. This module status information and hence the diagnostic bit is readily available to a user control program executing in the controller and to raise an alarm on an HMI when a fault is detected. Additional information about closed hop connections of concurrent connections can be obtained from a module programmatically through messages from the controller and via the HMI. Alternatively, this diagnostic information will also be available on module web pages.

Concurrent connections are fully compatible with functional safety such as those used in safety instrumented systems (SIS). Concurrent connections can carry safety data as data payload in black channel mode of operation for functional safety systems.

In yet another embodiment of communicating data over a high availability industrial control system, each controller in a redundant pair of controllers opens a connection using a set of rules to ensure that at least two open connections exist between a redundant target and source and that the two connections (or three connections for triple redundancy) between the redundant originators and the redundant targets use as divergent paths as possible. In the case of the system shown in FIG. 22, two controllers may attempt the connection open using the following paths listed in Table 2.

TABLE 2

Figure 22:
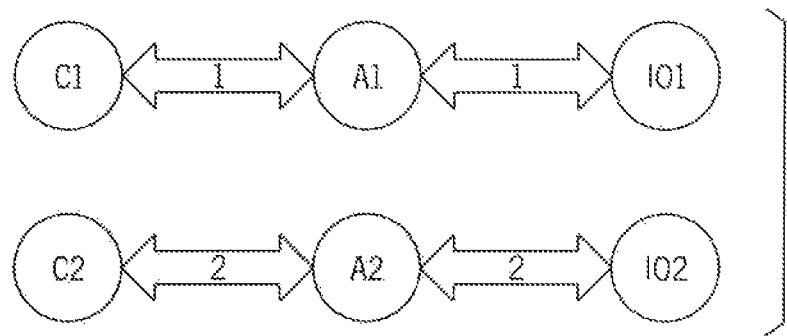
FIG. 22 is a block diagram representation of one embodiment of a dual redundancy system communicating data over an industrial control network in a high availability industrial control system according to another embodiment of the invention.

Exemplary connection paths in the HA control system of FIG. 22

| Controller 1 | Controller 2 |
|---|---|
| 1. C1 —> A1 —> IO1 | 1. C2 —> A2 —> IO2 |
| 2. C1 —> A1 —> IO2 | 2. C2 —> A2 —> IO1 |
| 3. C1 —> A2 —> IO1 | 3. C2 —> A1 —> IO2 |
| 4. C1 —> A2 —> IO2 | 4. C2 —> A1 —> IO1 |

Figure 23:
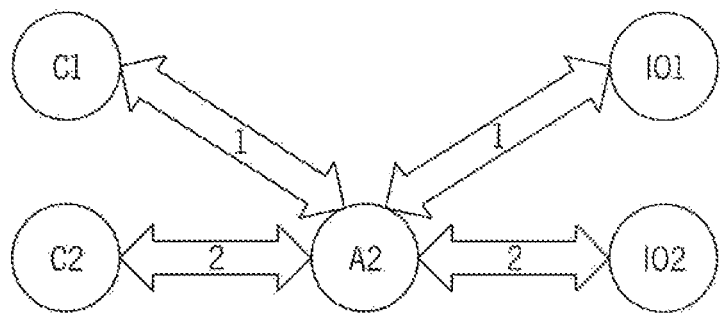
FIG. 23 is a block diagram representing the dual redundancy system of FIG. 22 with a single adapter module faulted.
Figure 24:
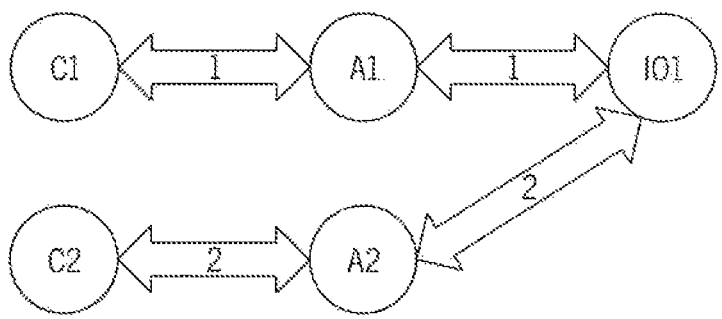
FIG. 24 is a block diagram representing the dual redundancy system of FIG. 22 with a single I/O module faulted.

If there is a single fault on one of the path segments or devices, only one of the controllers will encounter the fault and the other one of the controllers, therefore, will successfully complete the connection open on the first try. Examples of a single fault occurring in different modules for the embodiment of FIG. 22 are illustrated in FIGS. 23 and 24. In FIG. 23, the adapter module in the first connection path is faulted, and in FIG. 24, the I/O module in the second connection path is faulted. In FIG. 23, the second controller is successful in establishing a connection on the first try, and in FIG. 24, the first controller is successful in establishing a connection on the first try. While each of the controllers that failed on the first attempt are able to establish a redundant communication path in a subsequent connection open, there is no delay in the initial connection open, resulting in no performance loss at startup.

Figure 25:
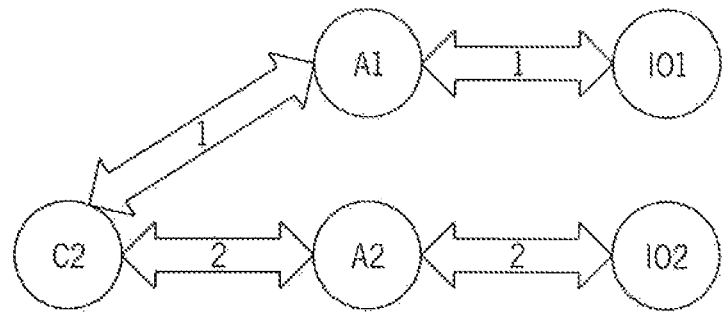
FIG. 25 is a block diagram representing the dual redundancy system of FIG. 22 with a single controller faulted.

If the controller is not part of redundant pair (or if its partner controller has faulted as shown in FIG. 25) the active controller will attempt to open two connections. A first connection open attempt is selected starting from the top of the connection list for that controller and the second connection open attempt is selected starting from the bottom of the list for that controller. With reference again to Table 2, the second controller in FIG. 25 establishes connections along the first and last connections in the connection list. As with the other embodiments of communicating data over a high availability industrial control system, this method allows communications to continue after multiple faults, provided faults do not occur on each component of a redundant pair.

When a controller detects a fault on its open connection, it will attempt to reopen the connection moving down its list of possible paths to find a working path. Provided this is the first fault, while the faulted controller is reopening its connection, the other controller's connection will remain open since they share no common components in their two paths. And while a controller is operating with a path other than its first choice, it will periodically retry the paths higher on its list to detect when a fault on the initial path is cleared.

Figure 26:
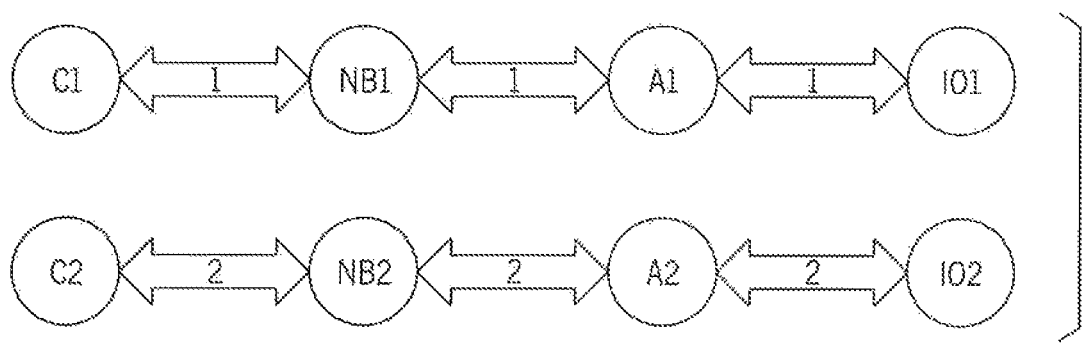
FIG. 26 is a block diagram representation of another embodiment of a dual redundancy system communicating data over an industrial control network in a high availability industrial control system according to another embodiment of the invention.
Figure 27:
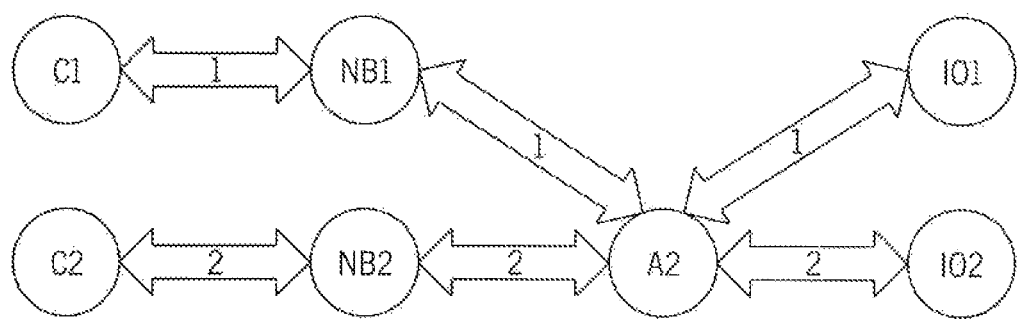
FIG. 27 is a block diagram representing the dual redundancy system of FIG. 26 with a single adapter module faulted.
Figure 28:
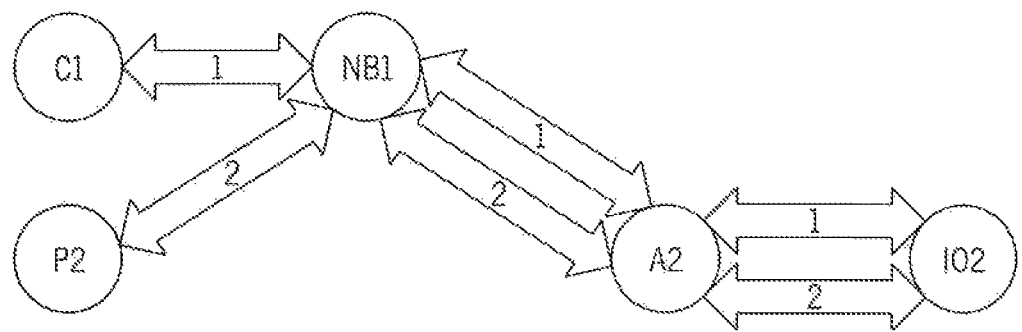
FIG. 28 is a block diagram representing the dual redundancy system of FIG. 26 with multiple modules faulted.
Figure 29:
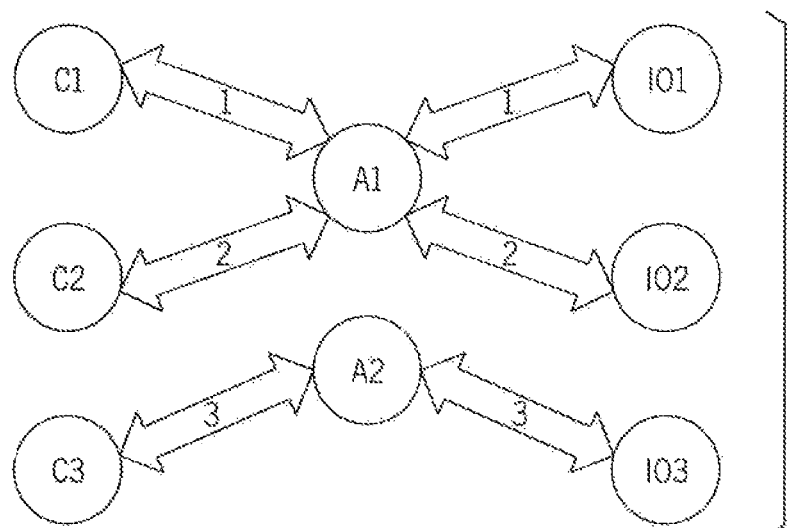
FIG. 29 is a block diagram representation of one embodiment of a partial triple redundancy system communicating data over an industrial control network in a high availability industrial control system according to another embodiment of the invention.

As with the other embodiments of communicating data over a high availability industrial control system, this method is extendable to additional layers of redundancy. FIGS. 26-28 show a system with redundant controllers, redundant network bridge modules, redundant adapters and redundant I/O modules. In the case of the system illustrated in FIG. 26, each of the two controllers would attempt the connection open using the following table of potential connection paths. FIGS. 27 and 28 illustrate exemplary fault conditions that may occur in the system.

TABLE 3

Exemplary connection paths in the HA control system of FIG. 26

| Controller 1 | Controller 2 |
|---|---|
| 1. C1 —> NB1 —> A1 —> IO1 | 1. C2 —> NB2 —> A2 —> IO2 |
| 2. C1 —> NB1 —> A1 —> IO2 | 2. C2 —> NB2 —> A2 —> IO1 |
| 3. C1 —> NB1 —> A2 —> IO1 | 3. C2 —> NB2 —> A1 —> IO2 |
| 4. C1 —> NB1 —> A2 —> IO2 | 4. C2 —> NB2 —> A1 —> IO1 |
| 5. C1 —> NB2 —> A1 —> IO1 | 5. C2 —> NB1 —> A2 —> IO2 |
| 6. C1 —> NB2 —> A1 —> IO2 | 6. C2 —> NB1 —> A2 —> IO1 |
| 7. C1 —> NB2 —> A2 —> IO1 | 7. C2 —> NB1 —> A1 —> IO2 |
| 8. C1 —> NB2 —> A2 —> IO2 | 8. C2 —> NB1 —> A1 —> IO1 |

Turning next to FIGS. 29-34, a HA control system with partial triple redundancy is illustrated. The controllers and I/O modules each exhibit triple redundancy (i.e., three modules) while the adapter modules only utilize parallel redundancy (i.e., two modules). Because the number of controllers and I/O modules at each end of the connection exceeds the number of adapters at an intermediate point in the connection, at least two controllers and at least two I/O modules must pass through one adapter, while the other controller and adapter may pass through the other adapter.

Figure 30:
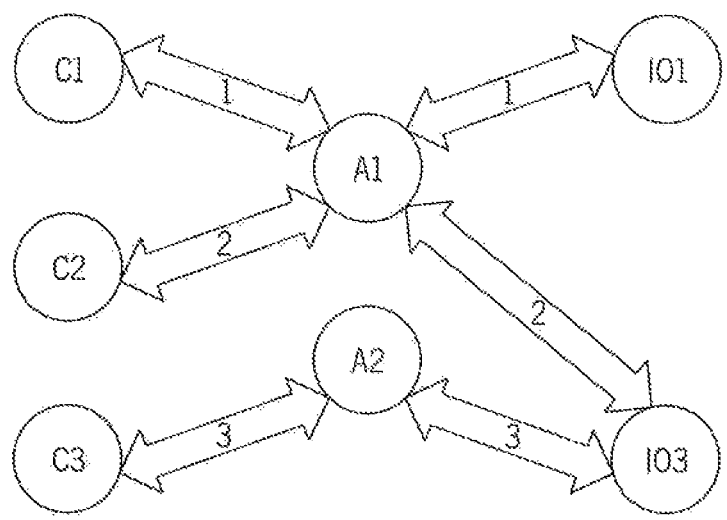
FIG. 30 is a block diagram representing the partial triple redundancy system of FIG. 29 with a single I/O module faulted.
Figure 31:
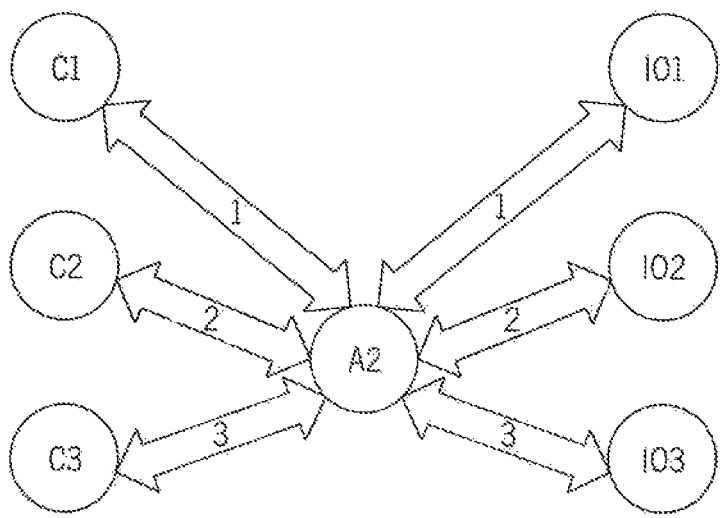
FIG. 31 is a block diagram representing the partial triple redundancy system of FIG. 29 with a single adapter module faulted.

In FIGS. 30 and 31 one of the redundant downstream modules in each path has failed. In FIG. 30, the second I/O module has failed. Controller 2, therefore, fails in its first open connection, but Controllers 1 and 3 are successful. Controller 2 selects another path from its list and opens a new path to I/O module 3. In FIG. 31, the first adapter has failed. Controller 3 is still able to successfully open its initial path. Controllers 1 and 2 must select an alternate path. Because this stage of the system has only parallel redundancy, each of the controllers ends up establishing a path through Adapter 2.

Figure 32:
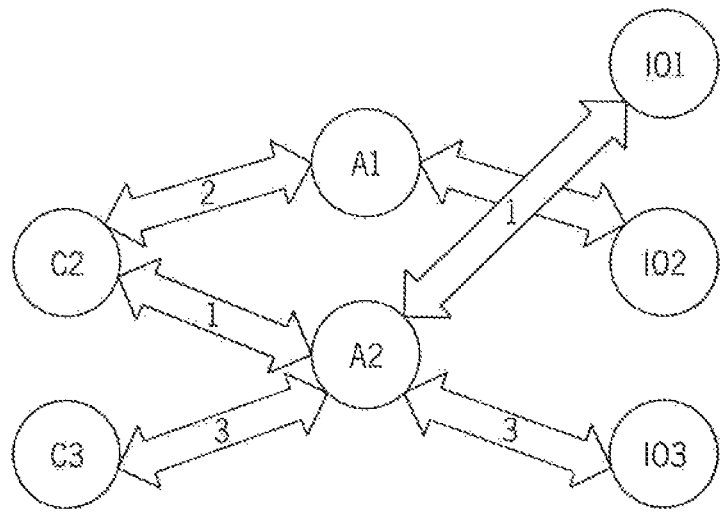
FIG. 32 is a block diagram representing the partial triple redundancy system of FIG. 29 with a first controller faulted.
Figure 33:
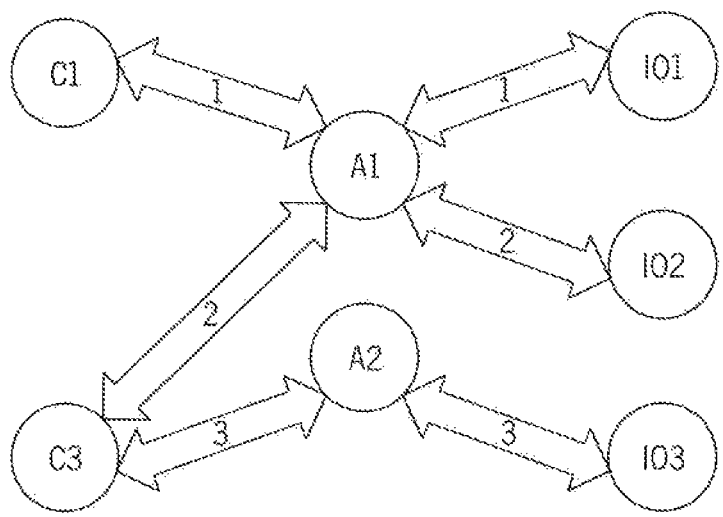
FIG. 33 is a block diagram representing the partial triple redundancy system of FIG. 29 with a second controller faulted.
Figure 34:
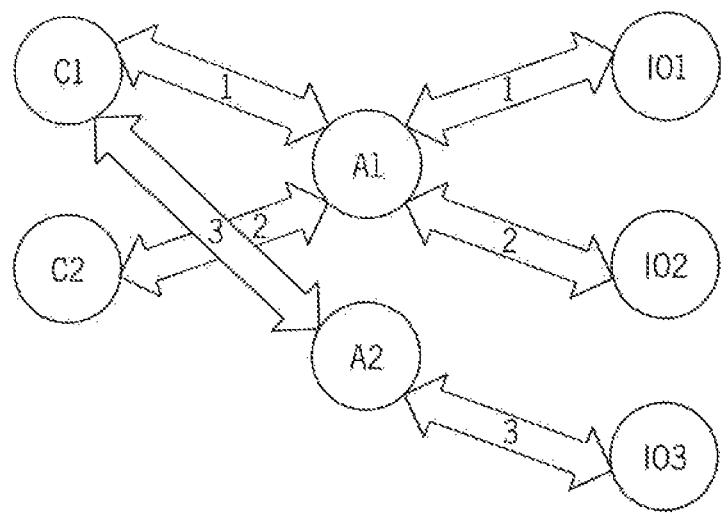
FIG. 34 is a block diagram representing the partial triple redundancy system of FIG. 29 with a third controller faulted.

Referring next to FIGS. 32-34, one of the controllers in the system has failed. If controller 1 fails, controller 2 opens a second connection starting at the bottom its list. If controller 2 fails, controller 3 opens a second connection starting at the bottom its list. And if controller 3 fails, controller 1 opens a second connection starting at the bottom its list. If two controllers fail, the remaining controller will open three connections.

Figure 35:
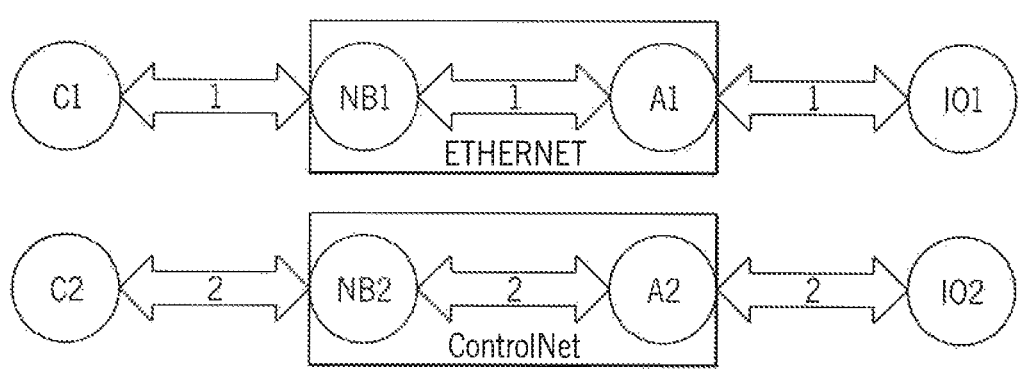
FIG. 35 is a block diagram representation of one embodiment of a system with redundant networks communicating data over an industrial control network in a high availability industrial control system according to another embodiment of the invention.
Figure 36:
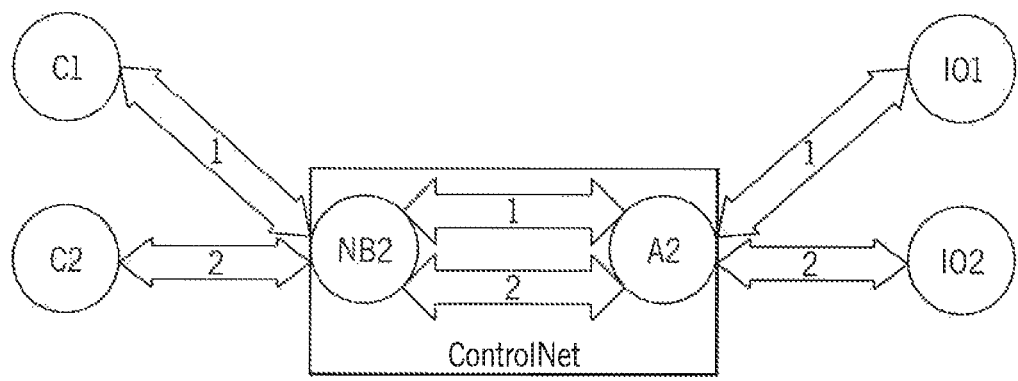
FIG. 36 is a block diagram representing the system with redundant networks of FIG. 35 with one network faulted.
Figure 37:
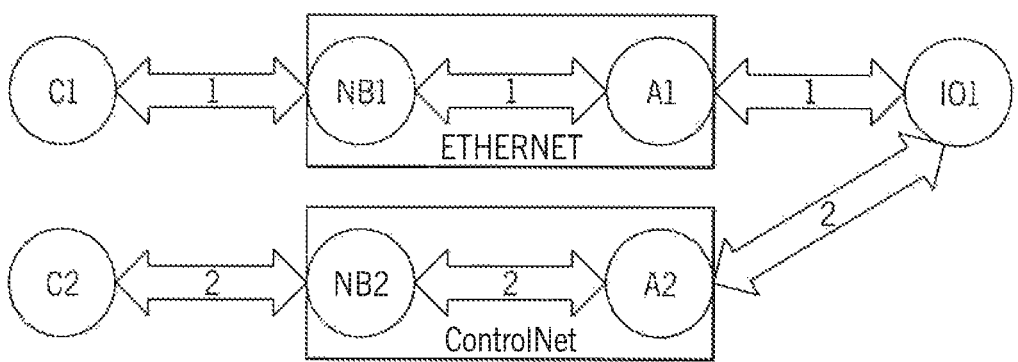
FIG. 37 is a block diagram representing the system with redundant networks of FIG. 35 with a single I/O module faulted.
Figure 38:
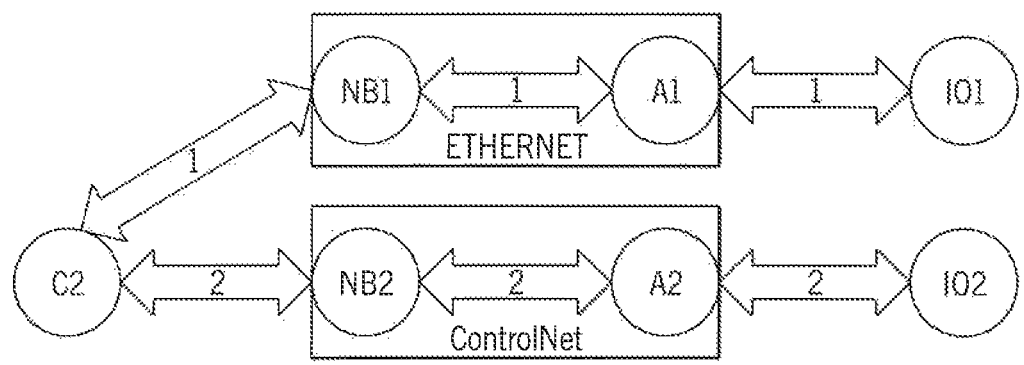
FIG. 38 is a block diagram representing the system with redundant networks of FIG. 35 with a single controller faulted.

It is also possible to setup a system using two totally independent networks. With reference next to FIG. 35, a HA control system using both an Ethernet network and a ControlNet network is illustrated. This system provides diversity while still maintaining the no-single-point-of-failure feature. FIGS. 36-38 illustrate the system of FIG. 35 in operation with redundant communication paths with a single fault in different modules. In the case of this HA control system, the controllers would attempt the connection open using the following table of connection paths.

TABLE 4

Exemplary connection paths in the HA control system of FIG. 35

| Controller 1 | Controller 2 |
|---|---|
| 1. C1 —> NB1 —> A1 —> IO1 | 1. C2 —> NB2 —> A2 —> IO2 |
| 2. C1 —> NB1 —> A1 —> IO2 | 2. C2 —> NB2 —> A2 —> IO1 |
| 3. C1 —> NB2 —> A2 —> IO1 | 3. C2 —> NB1 —> A1 —> IO2 |
| 4. C1 —> NB2 —> A2 —> IO2 | 4. C2 —> NB1 —> A1 —> IO1 |

Figure 39:
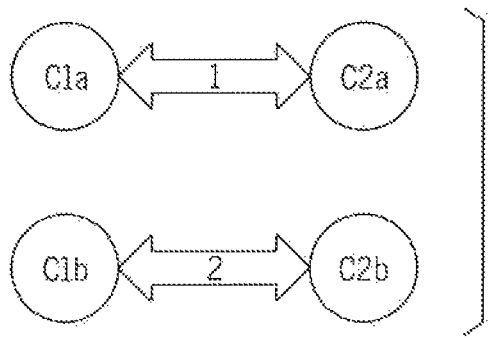
FIG. 39 is a block diagram illustrating redundant controllers for use in a high availability industrial control system.
Figure 40:
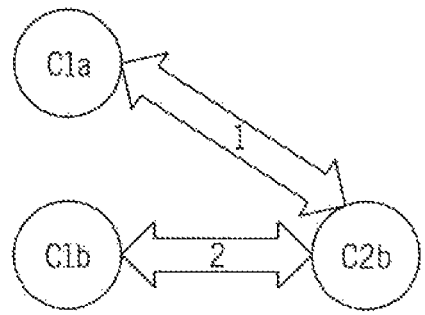
FIG. 40 is a block diagram representing the redundant controllers of FIG. 39 with a controller in one pair of controllers faulted.
Figure 41:
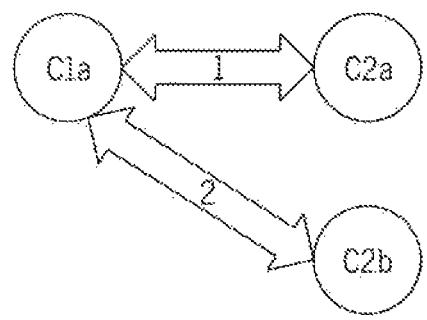
FIG. 41 is a block diagram representing the redundant controllers of FIG. 39 with a controller in the other pair of controllers faulted.
Figure 42:
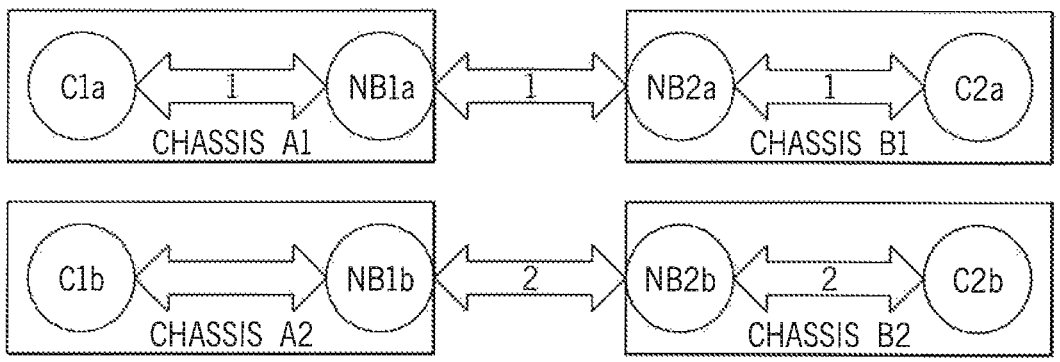
FIG. 42 is a block diagram illustrating redundant chassis for use in a high availability control system.
Figure 43:
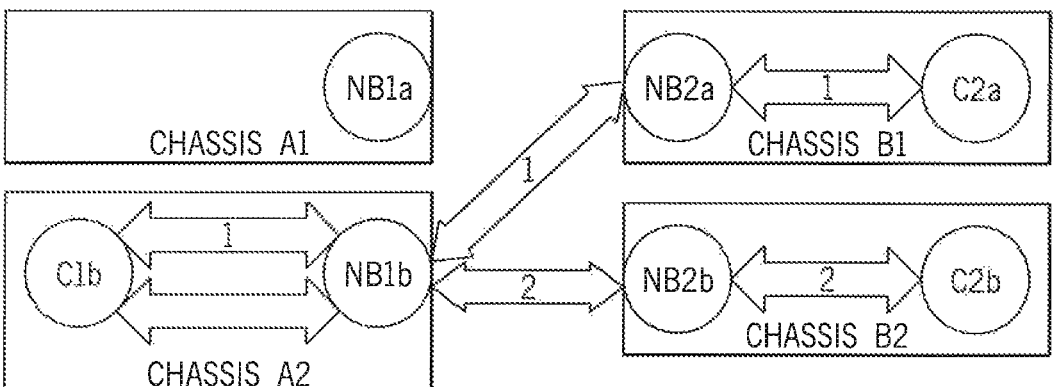
FIG. 43 is a block diagram representing the redundant chassis of FIG. 42 with one controller faulted.
Figure 44:
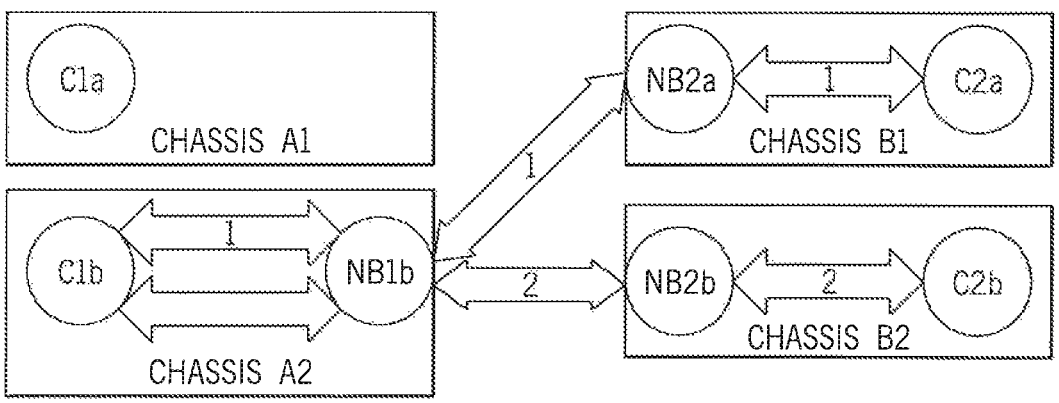
FIG. 44 is a block diagram representing the redundant chassis of FIG. 42 with one bridge module faulted.
Figure 45:
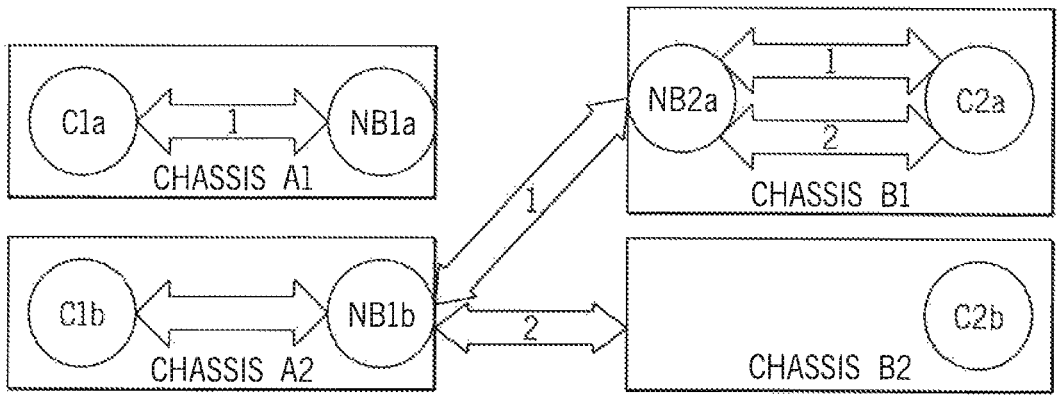
FIG. 45 is a block diagram representing the redundant chassis of FIG. 42 with a different controller faulted.
Figure 46:
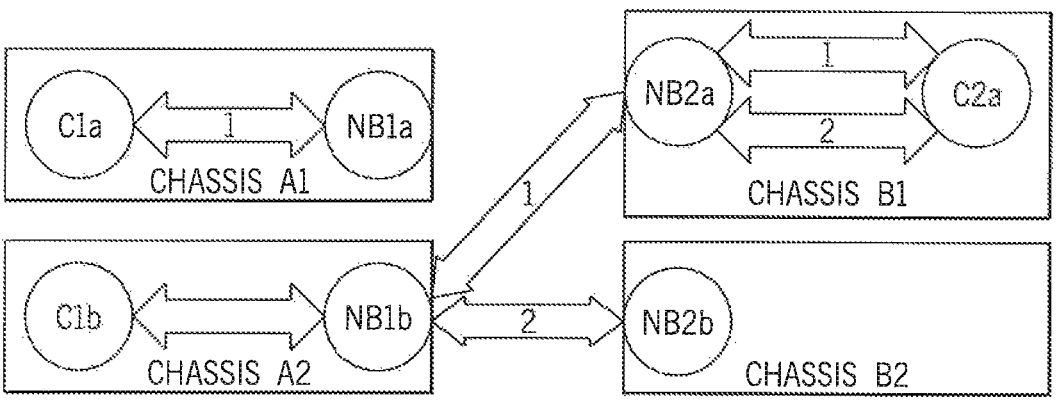
FIG. 46 is a block diagram representing the redundant chassis of FIG. 42 with a different bridge module faulted.
Figure 47:
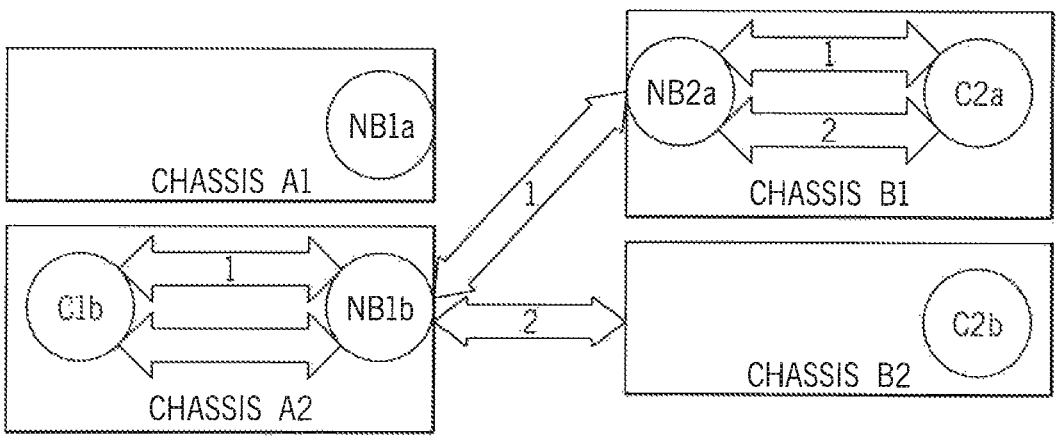
FIG. 47 is a block diagram representing the redundant chassis of FIG. 42 with a controller on one pair of controllers faulted and a bridge module on the other pair of controllers faulted.

While all the previous examples have been a controller (or set of controllers) communicating with I/O modules, concurrent connections can also be used for controller to controller communications. Also, previous examples, which included network bridge modules, showed the controller redundancy and network bridge redundancy as independent (module level redundancy). FIGS. 39-41 show a pair of redundant Controllers (C1a & C1b) communicating with another pair of redundant Controllers (C2a & C2b). A similar system could be built using any combination of triple redundancy controllers, dual redundant controllers, and simplex controllers. In the case of this system, controllers would attempt the connection open using the following table of connection paths.

TABLE 5

Exemplary connection paths between the redundant controllers of FIG. 39

| Controller 1a | Controller 1b |
|---|---|
| 1. C1a —> C2a | 1. C1b —> C2b |
| 2. C1a —> C2b | 2. C1ab —> C2a |

Redundancy is not always done at the device level. Redundancy, especially controller redundancy, is often done at the chassis level. In this type of system, the controller is paired with the network bridge modules as shown in FIGS. 42-47. In the case of this system, controllers would attempt the connection open using the following table of connection paths.

TABLE 6

Exemplary connection paths between the redundant controllers of FIG. 39

| Controller 1a | Controller 1b |
|---|---|
| 1. C1a —> NB1a —> NB2a —> C2a | 1. C1b —> NB1b —> NB2b —> C2b |
| 2. C1a —> NB1a —> NB2b —> C2b | 2. C1b —> NB1b —> NB2a —> C2a |

Pairing a network bridge module with a controller has certain advantages. No special connection handling is required between the bridge and adapter modules. Only the end points are involved in the generating the two active paths and in handling the reception of two packets. As a result, the number of communication packets on the networks is reduced.

Unsynchronized Operation

Referring now to FIGS. 48 and 49, in the above described industrial controller 5, concurrent operation of the controller 25a in the first controller chassis 10 and controller 25b in the second controller chassis 15 may be paused, for example, during re-booting, or upgrading of the firmware or programming used by one of the controllers 25, for example, controller 25a. Loss of concurrent operation may also occur in certain types of recoverable failures of the controller 25a.

During these times there will be a loss of synchronization between the controllers 25a and 25b as is a necessary side effect of controller 25a ceasing the program execution required to maintain its state to be identical to controller 25b for concurrent operation. The controller state is generally made up of internal program variables and the values of I/O data being processed by the program of the controller 25a. In certain cases, the program itself will also be lost. This breaking of synchronization is indicated by process block 400 of FIG. 48.

During loss of synchronization and cessation of program execution all open connections between controller 25a and the network 65 and the associated I/O modules 110 will be closed either by explicit command or through a timeout occurring when data is no longer being regularly transferred on the network 65 by the controller 25a for a predetermined period of time.

Importantly, despite loss of synchronization, the remaining controller 25b can continue to provide uninterrupted service to and thus high-availability of the industrial control system 5 through the mechanisms of concurrent data communication described above. Using concurrent data communication, at each communication node in the network 65, the valid control data of the operating controller 25b will take precedence and be forwarded to downstream nodes because such data will be the first data received by the node for each sequence number as there is no other data from controller 25a. This proper forwarding of valid control data occurs both before and after connections to the controller 25a are lost by timeout or otherwise.

After loss of synchronization and as indicated at succeeding process block 410, updated firmware may be delivered to the particular chassis, for example, to be loaded into memory 150 shown in FIG. 2. Although the figure indicates a loss of synchronization, in one example caused by updated firmware, loss of synchronization may also occur in the event of failure of the controller or other similar problems. process block 412, the new or previous firmware program may be reloaded or rebooted as necessary.

At the conclusion of process block 412, the controllers 25a and 25b must be re-synchronized and connections must be reestablished between the controller 25a and the remaining components of the network 65 including input and output modules 110a and 110b.

The synchronization process, shown by process block 416 in FIG. 48 and corresponding arrow in FIG. 49, generally involves a communication of state data and I/O data from the industrial controller 25b to the controller 25a so that the controller 25a may again operate concurrently with the controller 25b to generate redundant control values as discussed above.

The process of reestablishing connections indicated by process block 414 may involve the opening of thousands of connections and thus may begin before and continued during the synchronization process of process block 416. As discussed above, opening the connections is a process of reserving necessary communication resources at each component of the network 65 for each connection defined by a source and destination. The resources may include network bandwidth, buffer memory at various nodes of the communication network 64, scheduling priorities, and connection timeout values indicating when the connection should close after data is no longer being transmitted. Generally, the term "connection" as used henceforth may refer both to the entire data path between endpoints and two portions of the data path representing "hops" between various network components as will be evident from context.

Referring still to FIGS. 48 and 49, during the connection opening of process block 414 and synchronization of process block 416, the controller 25a may output "no-operation" data 419 along connections 418a and 418b indicated in the figures by dotted lines. This no-operation data 419 will typically be generated by firmware and may begin immediately after upgrading of firmware, for example, as connections are opened at process blocks 414 and synchronization occurs at process block 416. Importantly, generating the no-operation data 419 does not require any communication with the executing program on controller 25b or state information of the industrial control system 5 although the transmission of no-operation data 419 may continue even after controller 25b is partially synchronized and opening connections and the like as indicated in FIG. 48.

As will also be discussed in greater detail below, the no-operation data 419 will be contained in a standard data packet suitable for the particular connection and will reset any timeout values in the various network components to keep the connections open. The no-operation data 419 may, for example, employ a standard packet having a data payload holding a reserve data value indicating no-operation. Desirably the no-operation data when received by the I/O modules 110 will not provoke any action by the I/O module 110 and in particular will not in itself invoke a unique output value from the I/O module 110 although it is contemplated that the no-operation data may cause the I/O module 10 to move to a predefined safe state similar to that which occurs if the I/O module 110 loses all connections. This safe state may for example, may set the outputs of the I/O module to off, its last known state, or other similar predefined safe state.

Referring still to FIGS. 48 and 49, during the opening of connections and synchronization of process blocks 414 and 416, no-operation data 419 on connection 418a may pass from the controller 25a to a network component, for example, an adapter 422a and I/O module 110a, being representative of a node 430 of the communication network 65. The adapter 422a and I/O module 110a are associated, as depicted only by, for example, being in the same physical housing but are logically Independent of each other, the adapter 422a also working with the I/O module 110b.

In addition, no-operation data 419 may pass from the controller 25a on connection 418b to an adapter 422b associated with I/O module 110b in a manner analogous to concurrent data from the controller 25a. At the same time, standard control data 423 may be sent on connections 418c and 418d from dedicated circuitry 420b of controller 25b. As is understood in the art, the standard control data 423, will control the state of actuator signals 426 passing to an industrial process or the like 428 to control actuators associated with that process such as motors, solenoids, and the like.

Generally, the no-operation data 419 will not be associated with a sequence number used by the adapter 422 for regular control data 423 to determine which concurrent control data 423 received by the adapter 422 should be forwarded. Accordingly, the adapter 422 cannot evaluate the no-operation data 419 in the same manner as concurrent control data 423, that is, by forwarding only the first received data and suppressing the second received data for a particular sequence number. Several different ways of handling forwarding of the no-operation data 419 will be discussed below. In all cases and as shown in this example, it will be appreciated that the no-operation data 419 preserves the connections 418a and 418b during the synchronization process of process block 416 by preventing a timeout of the connections.

Referring again to FIG. 48, when the synchronization of process block 416 is complete, the controller 25a may be started again as indicated by process block 417 to begin sending control data 423 in lieu of the no-operation data 419. At this time, the industrial control system 5 returns to concurrent operation promoting high availability described in the early parts of this application. The no-operation data 419, by preserving the connections 418, eliminates delay in this startup operation 417 that might be caused by connections closing during a prolonged synchronization process of process block 416.

Referring now to FIGS. 50 and 51, consider an industrial control system 5 having controllers 25a and 25b communicating directly with network nodes 430a and 430b through first hop connections 418 which in turn communicate with network nodes 430c and 430d through second hop connections 418'. Generally, the network nodes 430 may be switches, adapters, routers and the like.

In one embodiment of the invention, the network nodes 430 may forward received no-operation data 419 to connections 418' irrespective of their order of arrival with respect to contemporaneous control data 423. This is consistent with the no-operation data 419 optionally not having a sequence number that would allow determination of receipt order. This approach to forwarding no-operation data 419 preserves second hop connections 418' of network node 430a such as would be lost in the case of an interruption 443 in the connection between controller 25b and network node 430a during unsynchronized operation of process blocks 400-416. Similarly, as shown in FIG. 51, a forwarding of the no-operation data 419 by node 430a and nodes 430c and 430d, in the case of complete failure of transmission of control data 423 from the controller 25b (which may still be able to perform synchronization operations), preserves downstream connections from downstream nodes 430c and 430d.

Figure 52:
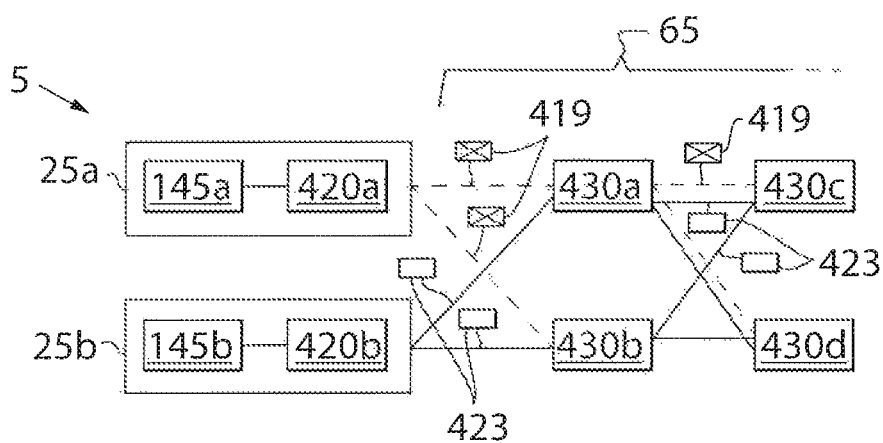
FIG. 52 is a figure similar to FIGS. 49-50 showing the significant increase in network traffic that can occur with a forwarding of no-operation traffic.

Referring now to FIG. 52 when there is no failure in the communication of control data from the processor 145b, however, it will be appreciated that an indiscriminate forwarding of the no-operation data 419 by each network node 430 creates substantial additional traffic on the network 65 at a level that increases substantially as one moves through the connections 418 of successive hops. So, for example, during such operation when there is no interruption of data from controller 25b, nodes 430c may receive three different sets of data including control data 423 from each of nodes 430a and 430b, and no-operation data 419 from node 430a.

For subsequent nodes 430, after nodes 430c and 430d, this number rises to four different sets of data being received by each node 430 including two sets of control data 423 and two sets of no-operation data 419. More complex topologies may provide even greater increases in network traffic.

In addition to the above bandwidth problems, allowing the unlimited propagation of no-operation data 419 can affect the established shutdown mechanism of many I/O modules 110, for example, shown in FIG. 49 which use the presence of open connections to determine whether they should move to a pre-established safe state (for example, when there are no open connections). By preserving open connections using no-operation data 419, those I/O modules 110 may fail to move to the safe state even though there are in fact no connections delivering contemporaneous control data.

Figure 53:
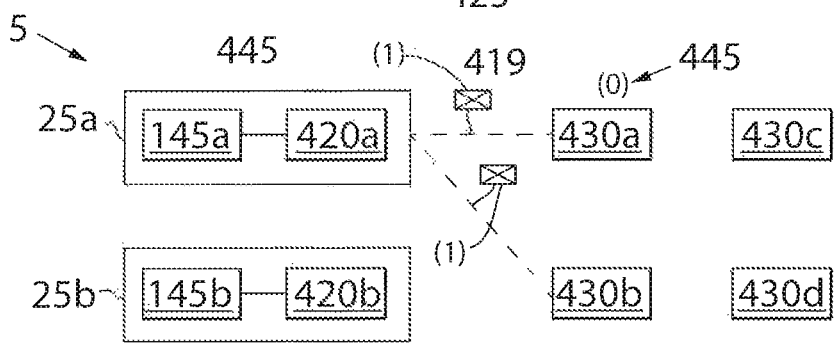
FIG. 53 is a figure similar to FIGS. 49-52 showing operation of a hop counter to reduce network bandwidth and to trigger shutdown states in the I/O modules.
Figure 54:
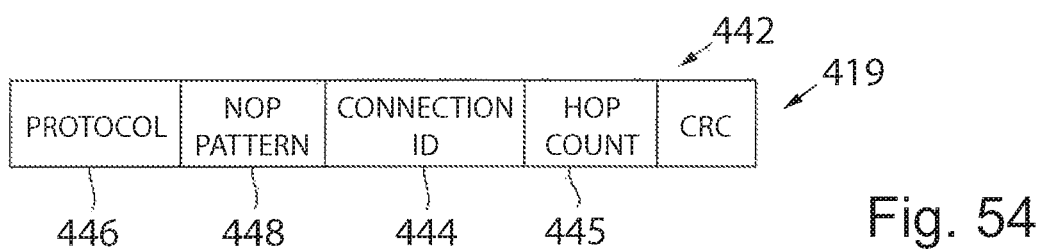
FIG. 54 is a figure similar to FIG. 12 showing a data packet used in a connection such as may include control data or no-operation data.

Accordingly, and referring to FIGS. 53 and 54, in one embodiment, the invention associates the data packet 442 used for the no-operation data 419 with a hop counter value 445. As no-operation data 419 is sent from the controller 25a, the hop counter is preset to a desired number of hops, the first hop being the connection from the controller 25 to a next network node 430, and the succeeding hops being each succeeding connection between directly connected nodes 430. In this example, the hop counter value 445 may be set to one at the time the no-operation data 419 leaves the controller 25a. When the no-operation data 419 is received by a first node 430a, the hop counter value 445 is decremented. At each node 430, only if the hop counter value 445 is greater than zero is the no-operation data 419 forwarded by the node 430. In this way propagation of the no-operation data 419 may be carefully limited. Ideally, the hop counter value 445 will be such as to prevent the no-operation data 419 from reaching the I/O modules 110. In some embodiments, the number of hops indicated by the hop counter value 445 may be such as to address the multiple failures discussed with respect to FIG. 1 (for example, by an initial setting of 2) and in other embodiments the hop counter value 445 may be set to address the single failures discussed with respect to FIG. 50 (for example, by an initial setting of 1). In this latter case, the hop counter value 445 will limit the number of hops to a point where a receiving node 430 cannot distinguish by virtue of the network topology whether the no-operation data 419 has come from controller 25a or 25b.

Referring still to FIG. 54, in all other respects the packet 442 may be substantially identical to the packets used for the control data 423 including a connection identifier 444, standard connection protocol data 446, and a payload 448 uniquely identifying the packet 442 as a no-operation packet but not including a sequence number. The payload 448 should be understood broadly to include data and/or control portions of the packet 442.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

What is claimed is:

1. An industrial controller of a type providing control data on an industrial control network to one or more I/O circuits generating signals to control an industrial process, the industrial controller operating in conjunction with a second industrial controller also communicating with the one or more I/O circuits to provide high-availability control of the industrial process, the industrial controller comprising a processor executing a control program held in non-transitory media to:
   (a) open a plurality of connections for communication of data on the industrial control network via a concurrent connection data packet, the plurality of connections subject to a timeout upon which they are closed when no concurrent connection data packet is communicated for a predetermined interval;
   (b) operate in a synchronized state with the second industrial controller to execute a same control program to communicate same control data to the industrial control network using the plurality of connections; and
   (c) operate in an unsynchronized state for communication of no-operation data via a second data packet to the industrial control network using the plurality of connections, wherein:
      the no-operation data present in the second data packet is different from the control data communicated by the concurrent connection data packet, and
      communication of the second data packet prevents closing of the plurality of connections as a result of the timeout of the plurality of connections even when the concurrent connection data packet is not communicated within the predetermined interval.

2. The industrial controller of claim 1 wherein during the unsynchronized state the industrial controller operates to update at least one of a firmware and a programming of the industrial controller.

3. The industrial controller of claim 2 wherein the first industrial controller further operates to synchronize its state with the second industrial controller.

4. The industrial controller of claim 1 wherein the industrial controller further (d) operates in a failed state providing no data to the industrial control network using the plurality of connections.

5. The industrial controller of claim 1 wherein the no-operation data is contained as a data portion of the second data packet.

6. The industrial controller of claim 1 wherein the same control data from the first industrial controller and the second industrial controller and the no-operation data for a given open connection share a same connection identifier attached to the data.

7. The industrial controller of claim 6 wherein the no-operation data does not have a data sequence number corresponding to the control data provided by the second industrial controller.

8. The industrial controller of claim 1 wherein the no-operation data does not have a unique output value when received by I/O modules.

9. An industrial control system comprising:
   an industrial control network;
   one or more I/O circuits configured to generate signals to control an industrial process, wherein the one or more I/O circuits are operatively connected to the industrial control network;
   a first industrial controller configured to provide control data via the industrial control network to the one or more I/O circuits;
   a second industrial controller configured to provide control data via the industrial control network to the one or more I/O circuits, wherein:
      the first and the second industrial controllers operate together to provide high availability control of the industrial process, and
      the first industrial controller includes a processor configured to execute a control program held in non-transitory media to:
         open a plurality of connections for communication of data on the industrial control network via a concurrent connection data packet, the plurality of connections subject to a timeout upon which they are closed when no concurrent connection data packet is communicated for a predetermined interval;
         operate in a synchronized state with the second industrial controller to execute a same control program to communicate same control data to the industrial control network using the plurality of connections;
         operate in an unsynchronized state for communication of no-operation data via a second data packet to the industrial control network using the plurality of connections, wherein:
            the no-operation data present in the second data packet is different from the control data communicated by the concurrent connection data packet, and
            communication of the second data packet prevents closing of the plurality of connections as a result of the timeout of the plurality of connections even when the concurrent connection data packet is not communicated within the predetermined interval; and
         attach a hop counter value to the second data packetno operation data; and further including
      network communication nodes receiving configured to receive data on the open plurality of connections for forwarding that data on other connections, wherein the network communication nodes:
      (i) when presented with control data and no-operation data on the plurality of connections, forward the control data and decrement the hop counter value of the second data packet and forward the second data packet on to an other connection connections only when the hop counter value has not decremented to zero; and
      (ii) when presented with first control data and second control data, select between the first control data and second control data to forward one of the first control data and second control data to the other connection.

10. The industrial control system of claim 9 wherein the first industrial controller sets the hop counter value so that the second data packet is not transmitted to nodes or I/O modules once an origin of the no-operation data cannot be identified to one of the first industrial controller and the second industrial controller.

11. A method of operating an industrial controller of a type providing control data on an industrial control network to one or more I/O circuits generating signals to control an industrial process, the industrial controller operating in conjunction with a second industrial controller also communicating with the one or more I/O circuits to provide high-availability control of the industrial process, the method comprising operating the industrial controller to execute a control program held in non- transitory media to:

(a) open a plurality of connections for communication of data on the industrial control network via a concurrent connection data packet, the plurality of connections subject to a timeout upon which they are closed when no concurrent connection data packet is communicated for a predetermined interval;

(b) operate in a synchronized state with the second industrial controller to execute a same control program to communicate same control data to the industrial control network using the plurality of connections; and (c) operate in an unsynchronized state for communication of no-operation data via a second data packet to the industrial control network using the open plurality of connections, wherein:

the no-operation data present in the second data packet is different from the control data communicated by the concurrent connection data packet, and communication of the second data packet prevents closing of the plurality of connections as a result of the timeout of the plurality of connections even when the concurrent connection data packet is not communicated within the predetermined interval.

12. The method of claim 11 wherein during the unsynchronized state the industrial controller operates to update at least one of firmware and programming of the industrial controller.

13. The method of claim 12 wherein the first industrial controller further operates to synchronize its state with the second industrial controller.

14. The method of claim 11 wherein the industrial controller further: (d) operates in a failed state providing no data to the industrial control network using the plurality of connections.

15. The method of claim 11 wherein the no-operation data is contained as a data portion of the second data packet.

16. The method of claim 11 wherein the same control data from the first industrial controller and the second industrial controller and the no-operation data for a given open connection share a same connection identifier attached to the data.

17. The method of claim 11 wherein the no-operation data does not include a data sequence number and the control data does include a data sequence number.

18. The method of claim 11 wherein the industrial controller further operates to attach a hop counter second data packet and further including network communication nodes receiving data on the plurality of connections for forwarding that data on an other connection, wherein the network communication nodes: (i) when presented with control data and no-operation data on the plurality of connections, forward the control data and decrement the hop counter value of the second data packet and forward the second data packet on to the other connection only when the hop counter value has not decremented to zero; and (ii) when presented with first control data and second control data, select between the first control data and second control data to forward one of the first control data and second control data to the other connection.

19. The method of claim 18 wherein the first industrial controller sets the hop counter value so that the second data packet is not transmitted to nodes or I/O modules once an origin of the no-operation data cannot be identified to one of the first industrial controller and the second industrial controller.

* * * * *